United States Patent
Hayes et al.

(10) Patent No.: US 9,234,067 B2
(45) Date of Patent: Jan. 12, 2016

(54) MATERIAL FORMING SUPRAMOLECULAR STRUCTURES, PROCESS AND USES

(75) Inventors: Wayne Hayes, Reading (GB); Philip James Woodward, Ackworth Pontefract (GB); Alex Clarke, Brentwood (GB); Andrew Trevithick Slark, Wokingham (GB)

(73) Assignee: Henkel AG & Co. KGaA, Duesseldorf (DE)

(*) Notice: Subject to any disclaimer, the term of this patent is extended or adjusted under 35 U.S.C. 154(b) by 1038 days.

(21) Appl. No.: 11/603,733

(22) Filed: Nov. 22, 2006

(65) Prior Publication Data

US 2008/0200718 A1 Aug. 21, 2008

(30) Foreign Application Priority Data

Dec. 1, 2005 (EP) .................................. 05026211

(51) Int. Cl.
| | |
|---|---|
| *C08G 18/00* | (2006.01) |
| *C08G 18/32* | (2006.01) |
| *C09J 175/02* | (2006.01) |
| *C08G 18/10* | (2006.01) |
| *C08G 18/28* | (2006.01) |

(52) U.S. Cl.
CPC .............. *C08G 18/325* (2013.01); *C08G 18/10* (2013.01); *C08G 18/2875* (2013.01); *C08G 18/3275* (2013.01); *C08G 18/3281* (2013.01); *C09J 175/02* (2013.01); *C09J 2201/61* (2013.01)

(58) Field of Classification Search
CPC .............. C08G 18/325; C08G 18/2875; C08G 18/3275; C08G 18/10; C08G 18/3281; C09J 175/02; C09J 2201/61
USPC .......... 528/60, 65, 85, 61, 905, 48, 59, 62, 64; 156/330.9, 331.4, 331.7
See application file for complete search history.

(56) References Cited

U.S. PATENT DOCUMENTS

| | | | |
|---|---|---|---|
| 3,226,345 A | 12/1965 | Saunders | |
| 4,110,286 A | 8/1978 | Vandegaer | |
| 4,324,739 A * | 4/1982 | Zondler et al. | 558/445 |
| 4,522,986 A * | 6/1985 | Short et al. | 525/458 |
| 5,176,985 A * | 1/1993 | Seitz et al. | 430/284.1 |
| 5,221,707 A * | 6/1993 | Chihara et al. | 524/267 |
| 5,879,754 A * | 3/1999 | Geist et al. | 427/458 |

(Continued)

FOREIGN PATENT DOCUMENTS

| | | | | |
|---|---|---|---|---|
| EP | 1310533 A2 | 5/2003 | | |
| JP | 02189320 | * | 7/1990 | C08G 18/18 |

(Continued)

OTHER PUBLICATIONS

Petrovic et al. The effect of crosslinking on properties of polyurethane elastomers. Journal of Applied Polymer Science, vol. 42, 1991, pp. 391-396.

(Continued)

*Primary Examiner* — Michael L Leonard
(74) *Attorney, Agent, or Firm* — James E. Piotrowski

(57) ABSTRACT

A novel material, forming supramolecular structures below its transition temperature, which contains at least one C=O and/or C=S group and at least one N—H, O—H and/or S—H group and wherein the material has the structure $$A(\text{-}X\text{—}B)_n \qquad (1)$$

Figure 1:
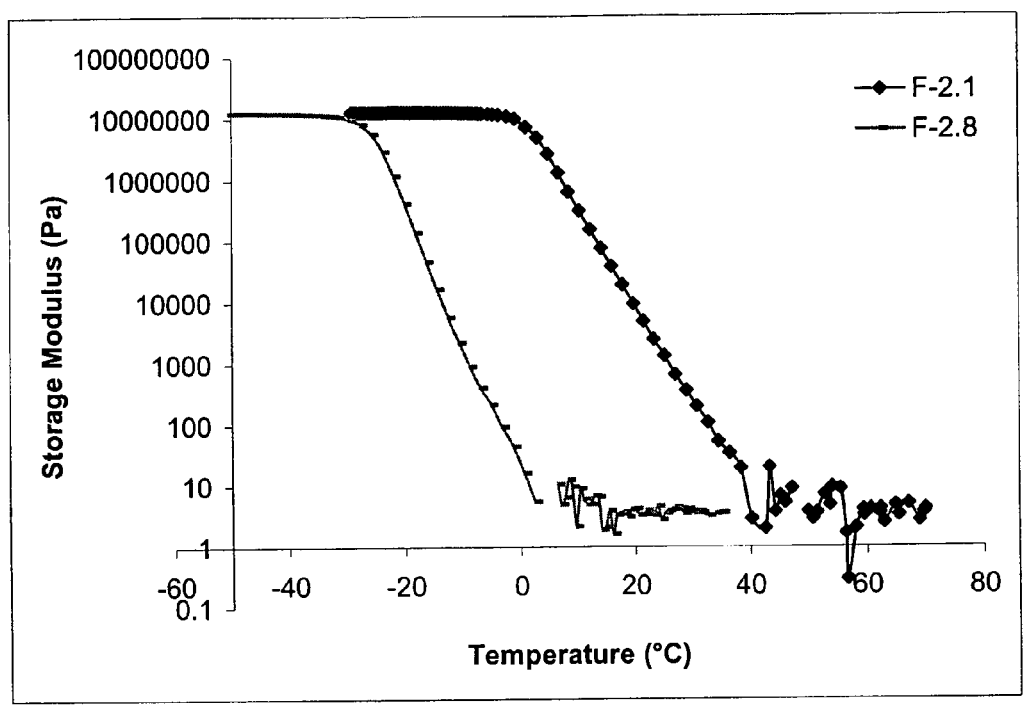

wherein A, X, B and n are defined. Also a process for preparation of the material and uses thereof.

16 Claims, 3 Drawing Sheets

(56) References Cited

U.S. PATENT DOCUMENTS

| | | |
|---|---|---|
| 6,423,756 B1 * | 7/2002 | Ghobary et al. ............ 521/128 |
| 6,683,151 B1 * | 1/2004 | Loontjens et al. ............ 528/44 |
| 2002/0086115 A1 * | 7/2002 | Lamers et al. ............ 427/385.5 |
| 2004/0034190 A1 | 2/2004 | Janssen et al. |
| 2004/0087755 A1 * | 5/2004 | Eling et al. ............ 528/59 |
| 2005/0085573 A1 | 4/2005 | Sandner et al. |
| 2006/0159870 A1 * | 7/2006 | Lenges et al. ............ 428/31 |
| 2007/0031679 A1 * | 2/2007 | Ushida et al. ............ 428/423.1 |

FOREIGN PATENT DOCUMENTS

| | | | | |
|---|---|---|---|---|
| JP | 03048652 A | | 3/1991 | |
| JP | 05155841 A | | 6/1993 | |
| JP | 08301837 A | | 11/1996 | |
| JP | 10226675 A | | 8/1998 | |
| JP | 11323301 A | * | 11/1999 | ............ C09J 175/04 |
| JP | 2004026742 A | | 1/2004 | |
| JP | 2005340496 A | | 12/2005 | |
| JP | 2006160734 A | | 6/2006 | |
| WO | 9814504 A1 | | 4/1998 | |
| WO | 2005042641 A1 | | 5/2005 | |

OTHER PUBLICATIONS

Sijbesma et al. Reversible Polymers Formed from Self-Complementary Monomers Using Quadruple Hydrogen Bonding. Science, vol. 278, No. 5343, Nov. 28, 1997, pp. 1601-1604.

Lange, R.F. et al. Supramolecular Polymer Interactions Based on Alternating Copolymer of STyrene and Maleimide. Macromolecules, 1995, 28, pp. 782-783.

Beijer, F.H. et al. Strong dimerization of ureidopyrimidones via quadruple hydrogen bonding. J. Am. Chem. Soc., 1998, 120 (27), pp. 6761-6769.

Marand, Eva et al. Spectroscopic characterization of hydrogen bonding in poly(urethane-rotaxane)s. Macromolecules 1996, 29, pp. 2555-2562.

Xu, Zhihua et al. Strengthening polymer phase boundaries with hydrogen-bonding random copolymers. Macromolecules, 1997, 30 (25), pp. 7958-7963.

Peng, Chih-Cheng et al. A Simple Pathway toward Quantitative Modification of Polybutadiene: A New Approach to Thermoreversible Cross-Linking Rubber Comprising Supramolecular Hydrogen-Bonding Networks. Macromolecules, 2005, 38 (13), pp. 5575-5580.

* cited by examiner

US 9,234,067 B2

MATERIAL FORMING SUPRAMOLECULAR STRUCTURES, PROCESS AND USES

This application claims priority under 35 U.S.C. §119 (a)-(d) of European Patent Application No 05 026 211.2 filed Dec. 1, 2005, the contents of which are incorporated by reference in their entirety.

FIELD OF THE INVENTION

The invention relates to a novel material forming supramolecular structures below its transition temperature, a process to make the material and its uses.

BACKGROUND OF THE INVENTION

Supramolecular chemistry focuses on going "beyond" molecular chemistry, which are systems containing more than one molecule. These systems are based on non-covalent interactions such as hydrogen bonds, van der Waals forces, pi-pi interactions and/or electrostatic effects. For instance, a supramolecular polymer is an organic compound which obtains its polymeric properties through combinations of covalent bonds and specific secondary interactions with high physical bond strengths that contribute substantially to the properties of the resulting material. These polymers show unique characteristics due to the presence of additional physical interactions that are based, most typically, on multiple hydrogen bonding interactions, which are named supramolecular interactions.

Supramolecular compounds, such as polymers, are described e.g. in Macromolecules (1995, 28, 782-783) by Lange and Meijer. The method described therein is radical polymerization of e.g. styrene and a maleimide monomer producing H-bonding units containing 3 H-bonds in a row. The resulting polymer was mixed with melamine, leading to supramolecular structure which is quite brittle and has no adequate mechanical properties.

EP 1 310 533 A2 describes an ink composition which contains a dye capable of self-assembling under appropriate conditions, assembling with another analogous dye as well as of forming supramolecular structures. The latter are based on at least three acceptor/donor interactions per interacting unit, whereas at least one of these interactions arises from a heterocyclic unit. Thus, they are difficult to make and therefore expensive.

Sijbesma et al (Science, 278, 1601) discloses supramolecular polymers comprising quadruple hydrogen bonding units that are capable of forming at least four H-bridges with each other leading to physical interactions between different polymer chains. The physical interactions originate from multiple hydrogen bonding interactions (supramolecular interactions) between self-complementary units, which are based on 2-ureido-4-pyrimidones, comprising at least four hydrogen bonds in a row.

WO 98/14504 A1 describes supramolecular polymers containing monomeric units that form H-bridges with one another, whereas the H-bridge-forming monomeric units in pairs forming at least 4 H-bridges with one another. Preferably, the H-bridge-forming monomeric units are self-complementary and constitute an essentially flat structure. The monomeric unit giving rise the H-bridge formation contains most typically a heterocycle and is complex in nature, and therefore difficult and expensive to make.

US 2004/0034190 A1 describes the preparation of supramolecular polymers by copolymerization of monomers containing quadruple hydrogen bonding units with regular monomers. The monomers have a polymerizable group (a), a linking moiety (b) and a structural element (c) which is capable of forming four hydrogen bridges or more. The structural elements (c) contain most typically a heterocycle and are fairly complex in nature. Thus (c), and in particular the monomer itself, is quite difficult to make and therefore expensive.

WO2005/042641 A1 describes the preparation of a supramolecular polymer comprising quadruple hydrogen bonding units within the polymer backbone, wherein at least a monomer comprising a 4H-unit is incorporated in the polymer backbone via at least two-four reactive groups.

In all of these cases, the structural 4-H units giving rise to hydrogen bond formation contains most typically a heterocycle and is complex in nature, and therefore difficult and expensive to make. Owing to their rigidity, there can be difficulties in compatibility, solubility and processability when making or using the supramolecular polymers.

US 2004/0087755 A1 discloses a polyurethane chain polymer with functional groups able to form a supramolecular polymer. They are typically formed from heterocyclic amines reacting with isocyanate end-groups to produce multiple H-bonds per binding units. Due to their nature, the heterocyclic amines are difficult to dissolve or compatibilise with other materials. This limits the number of possible structures that can be produced and their application.

U.S. Pat. No. 6,683,151 B1 describes a compound comprising a reaction product of (A) an isocyanate functional compound of which at least 40 wt. %, relative to the total amount of (A), has a molecular weight of at least about 500, and (B) a nitrogen-containing compound capable of reacting with said isocyanate functional compound (A). This isocyanate functional compound (A) is itself a reaction product between an isocyanate and a compound containing at least one functional group and at least 40% by weight of the latter having a weight average molecular weight of at least about 450. The nitrogen-containing compound (B) is for instance melamine, urea, acetoguanamine, benzoguanamine, cyanamide and/or isocytosine. The reaction product of (A) and (B) has a molecular weight of less than about 20,000 and comprises an effective amount of groups that are able to form reversible intermolecular physical interactions such that a resulting compound shows polymeric mechanical properties at a temperature below a transition temperature. This compound is very complex in nature, expensive and due to the many constraints imparts not a big flexibility in product design.

SUMMARY OF THE INVENTION

The object of the present invention was to provide new types of materials which are capable of forming supramolecular structures reversibly at different temperatures. It should be straightforward to vary their composition easily, leading to many different types of properties of the supramolecular structures, thus adapting and optimising it to the various application requirements. The transition temperature, the hydrophilic and lipophilic nature as well as the polarity of the material must be easy adjustable to optimise the properties. The precursors should allow facile and versatile synthesis and processing and the resulting products should be readily soluble and/or compatible with other materials. Both, the precursors and the products should be cost-effective to allow use in a wide variety of applications. Furthermore, the supramolecular structures must impart good stability at elevated temperatures to avoid side reactions and/or oxidations

BRIEF DESCRIPTION OF THE DRAWING FIGURES

Figure 2:
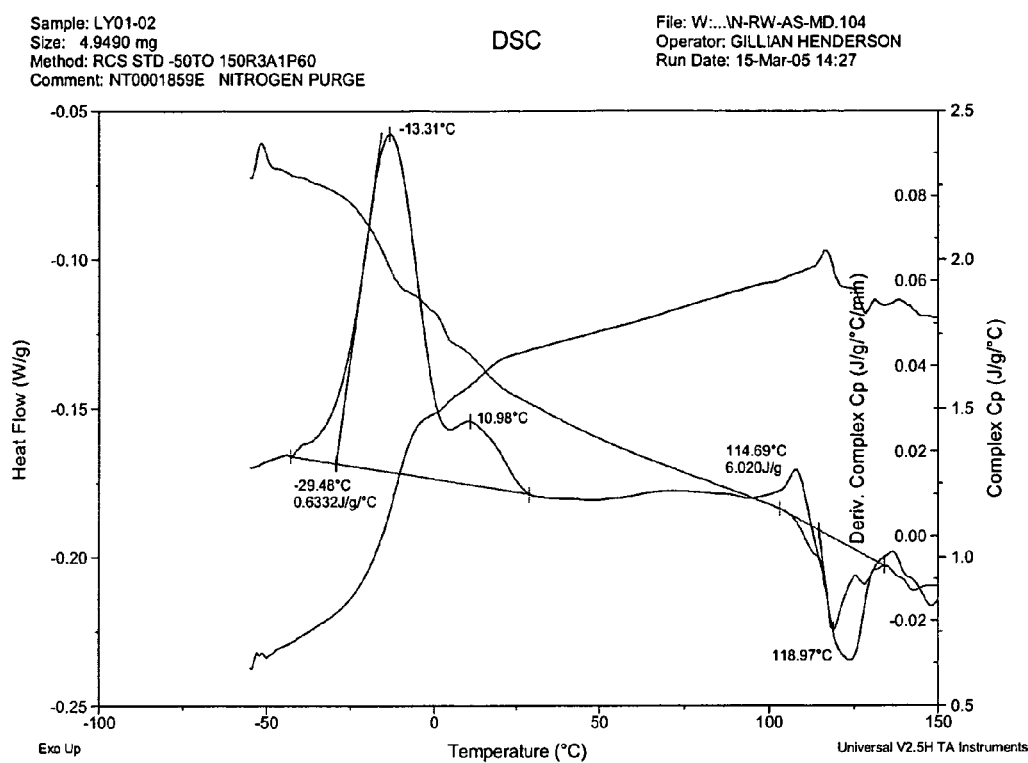
Figure 3:
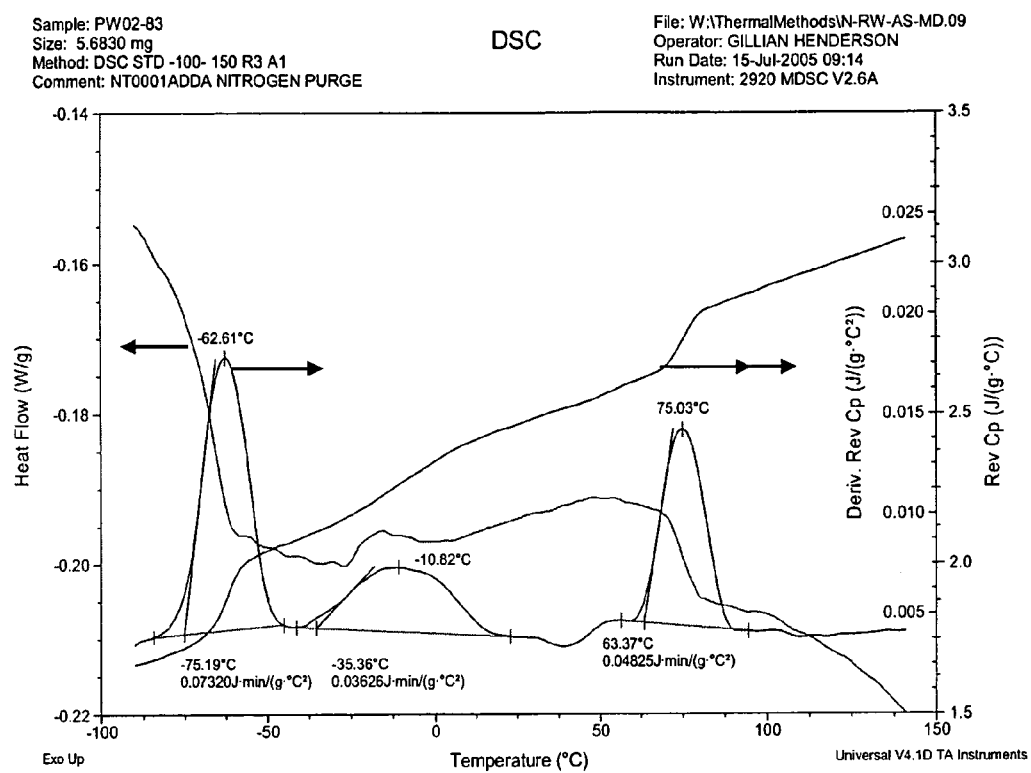

FIG. 1 shows rheological plots of the Formula F-2.1 and Formula F-2.2 compounds.
FIG. 2 shows DSC plots of the Formula F-2.1 compound.
FIG. 3 shows DSC plots of the Formula F-4.2 compound.

DETAILED DESCRIPTION OF THE INVENTION

It was now surprisingly found that all the objectives of the invention can be achieved by a material which contains at least one "C═O" and/or "C═S" unit and at least one N—H, O—H and/or S—H group and wherein the material has the structure

$$A(\text{-}X\text{—}B)_n \quad (1)$$

wherein A is a cyclic, aromatic and/or aliphatic group, n being a number of 1 to 4, —X—B is, if n is 2, the same or different, and if n is 3 or 4, the same, partly the same or different and has one of the structures (2) to (4)

$$\text{—NH—C(Y)—Y—B} \quad (2)$$

$$\text{—NH—C(Y)—NR—B} \quad (3)$$

$$\text{—Y—C(Y)—NR—B} \quad (4)$$

with Y being an Oxygen and/or Sulfur atom, B being an organic group with at least one heteroatom, where the heteroatom is bound to at least two carbon atoms when B is linear or cyclic, and where the heteroatom is bound to at least one carbon atom when B is branched, and R being a Hydrogen atom, a cyclic, aromatic and/or aliphatic group or another B group which is the same or different.

The transition temperature indicates the temperature below which the supramolecular interactions substantially change the physical properties of the materials. It is obtained by rheological measurements. When G' ($T_1$) is the plateau of G' at low temperature and G' ($T_2$) is the plateau of G' at high temperature, the transition temperature is calculated as the temperature where G'=[G' ($T_1$)–G' ($T_2$)]/2. The transition temperature is broad and occurs over a temperature range. The mid-point of the transition temperature of the inventive materials is between about −50° C. and +200° C., preferably between about −30° C. and +150° C., more preferably between −20° C. and +120° C. and in particular between −10° C. and +80° C.

Well below the transition temperature, the material behaves more like an elastic solid, and well above the transition temperature more like a liquid. For instance, the supramolecular structure has 40° C. below the transition temperature a high storage modulus of about 1,000,000 Pa or higher, preferably 5,000,000 Pa or higher, and in particular about 10,000,000 or higher. However, upon temperature increase above the transition temperature, the storage modulus decreases rapidly at 40° C. above the transition temperature to about lower than about 100,000 Pa or lower, and in particular 10,000 Pa or lower, which are typical for materials having a polymeric segment A. They tend to have higher storage modulus than low molecular weight materials, which have preferably a storage modulus at this temperature of even about 1,000 Pa or lower, preferably about 100 Pa or lower, and in particular about 10 Pa or lower. However, the difference of the storage modulus measured at these two temperatures is at least about 1000 Pa and preferably at least 10,000 Pa, which applies in particular for polymeric materials. However, for lower molecular weight materials it is preferably at least 100,000 Pa and in particular at about 1,000,000 Pa or higher.

It is of particular importance that the supramolecular structure of the inventive material is reversible. Thus, the supramolecular structure is lost upon increasing the temperature well above the transition temperature. However, when the temperature falls again well below the transition temperature, this supramolecular structure is formed again. This cycle can be repeated as long as the structure of the material remains the same or nearly the same.

Although the true supramolecular structure of the inventive material is unknown, it is believed that it forms an advantageous three dimensional structure, leading typically to better mechanical properties than planar compounds which tend to form two dimensional structures only.

The group A in the structure (1) has a cyclic, aromatic and/or aliphatic nature. Cyclic groups are aromatic, partly unsaturated and/or saturated, whereas aromatic and saturated groups are preferred. The cyclic groups can also contain heteroatoms such as Nitrogen, Oxygen and/or Sulfur, although such heterocycles are in particular in aromatic groups less preferred. Aliphatic groups can be fully saturated, partly unsaturated and/or can contain heteroatoms. Preferred aliphatic groups are saturated linear or branched hydrocarbons. In one embodiment, A has a low average molecular weight Mn of less than about 1000, preferably less than about 750, more preferably less than about 500, and in particular less than about 300.

In another embodiment, A contains an oligomeric or even polymeric segment with at least 3 monomeric repeating units. This is typically an addition polymer or a step-growth polymer, although other polymer types can be used as well. There is no restriction to the type of such a segment and they are one important factor to optimize the product performance for the various application requirements. Most typical oligomeric or polymeric segments are homopolymers, copolymers, blockpolymers and block-copolymers such as polyolefin, for instance poly(isobutylene), poly(ethylene-co-butylene), polybutadiene, poly(propylene)glycols, polystyrenes, poly (hydroxy styrene), polyacrylics, poly(meth)acrylic acids, poly(meth)acrylates, polyalkyl(meth)acrylates, polyhydroxyalkyl(meth)acrylates, poly(meth)acrylamides polyesters, polycarbonates, polyamides, polyethers, poly(ethylene glycol), poly(propylene glycol), polybutylene glycol, polyesters, e.g. formed from the condensation of one or more polyhydric alcohols having from 2 to 15 carbon atoms with one or more polycarboxylic acids having from 2 to 14 carbon atoms, polycarbonates, polyamides, polyimides, polyurethanes, e.g. made from any diol and diisocyanate, polyureas, polyacetals, polysiloxanes, polyvinyl ethers, polyvinyl esters and/or poly(vinyl acetate). Preferred are poly(isobutylene), poly(ethylene-co-butylene), polybutadiene, poly(propylene) glycols and poly(ethylene)glycols, while polyurethanes and polyureas are less preferred.

A further degree of flexibility is the molecular weight of these oligomeric and/or polymeric segments. If they just contain 3 monomeric repeating units, the molecular weight is rather low. However, it has basically no limitation. Thus, the molecular weight of the group A containing an oligomeric and/or polymer segment can have a very high average molecular weight Mn. However, it is often preferred that it is lower than about 100,000, preferably less than about 50,000, more preferably less than about 25,000 and in particular less than about 10,000.

A typical method of making such high molecular weight groups A is to let a diisocyanate react with the hydroxyl-, amine- and/or mercapto-terminated oligomeric and/or polymeric segment in the required ratio to obtain isocyanate terminated oligomers and/or polymers, which then can be used for further reactions. These reactions can be carried out in bulk or in solvent and are well known to the skilled person in the art.

The material can have one to four different substituents of the formula "—X—B". If there are more than one substituents, they can be the same or different. If there are two or more substituents, they can be all the same, partly the same and partly different, or all can be different. In many cases two or three substituents are preferred, in particular 2 substituents. If there is more than one substituent, it is often helpful when it is the same or similar. Similar means in this context that the molecular weight differs by not more than 100%, preferably not more than 50%, and in particular not more than 20%. Additionally, it is often advantageous, but not a must, that the type of branching and/or cyclic groups and/or the location of heteroatoms in the chain is equal or similar, e.g. that it differs not more than by 10 Carbon atoms, preferably not more than 5, and in particular not more than 3 Carbon atoms.

There is no restriction regarding the average molecular weight Mn of the organic group B, although it is typically lower than about 5000, preferably less than about 1000, more preferably less than about 500, and in particular less than about 150. Preferred aliphatic groups are saturated linear or branched hydrocarbons. Although there are no restrictions regarding the chain length, it is preferred to have $C_2$-$C_{50}$ chains, preferably $C_3$-$C_{35}$, more preferably $C_4$-$C_{20}$, and in particular $C_4$-$C_{10}$ chains.

When B is linear or cyclic, it contains at least one heteroatom, which is bound to at least two carbon atoms. When B is branched, the heteroatom is bound to at least one carbon atom. If the A and/or B contains cyclic groups, then it is preferred that they are saturated or aromatic cyclic groups. They also can contain heteroatoms, although this is less preferred, in particular in case of aromatic groups. Preferably, the heteroatom in B is Nitrogen, Oxygen and/or Sulfur. Hence, in linear or cyclic structures, ethers, thioethers and/or secondary or tertiary amines are preferred. In branched structures, the heteroatom can also form primary amines, alcohols and/or thiols.

In some cases it is preferred to have two or more heteroatoms. In such cases it can be advantageous to have at least one heteroatom, preferably a Nitrogen atom, which is bound to at least two carbon atoms and another heteroatom bound to one carbon atom, forming a primary amine, an alcohol and/or a thiol. The heteroatoms can be incorporated in a particular sequence to aid stronger interactions, but they also can be randomly distributed.

Furthermore, it is possible that B contains one or more halogen atoms and/or carboxylic groups. It is preferred that these groups are at or towards the end of the chain. When used, they often are together with at least one of the preferred heteroatoms. Hence, a large number of different structures can be obtained easily by varying the amount and the position of the heteroatoms, which will give the product different properties. Hence, use can be made of this large flexibility in optimising the product for various purposes, which is a big advantage of the current invention.

The groups A and B are linked together by the group X, which contains one Carbon atom, at least one Nitrogen atom, and at least one Oxygen and/or Sulfur atom as well as one or two Hydrogen Atoms, as indicated in the structures (2) to (4). Most typical groups are urea, urethane, thiourea and/or thio-urethane. Preferably, these groups are formed by reacting an isocyanate with an amine to form the urea linkage, or with an alcohol to form the urethane linkage. The corresponding Sulfur containing analogues are obtained by taking either thio-isocyanate and/or thiols. However, it is also possible to use other means as known by the skilled artisan. It is important to note that the urethane and the sulphur containing analogues can be linked to A either through Nitrogen, as shown with structure (2), or through Oxygen and Sulfur, respectively, as shown with structure (4). However, preferred are the urea and urethane groups, whereas the latter can be linked to A either way.

The Nitrogen atom, which is part of the group X, but linking the group B to X, does also contain the group R, which is a hydrogen atom, a cyclic, aromatic and/or aliphatic group or another B group which is the same or different. In case that R is a cyclic, aromatic and/or aliphatic group, there are no restrictions regarding the chain length, it is preferred to have $C_1$-$C_{50}$ chains, preferably $C_2$-$C_{35}$, more preferably $C_3$-$C_{20}$, and in particular $C_4$-$C_{10}$ chains.

Some of the preferred inventive materials are:

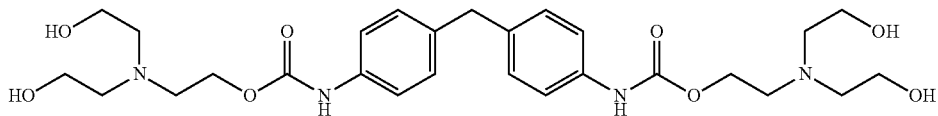

F-2.1

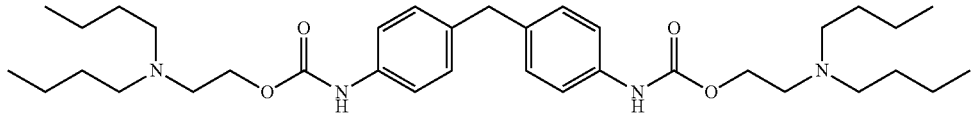

F-2.2

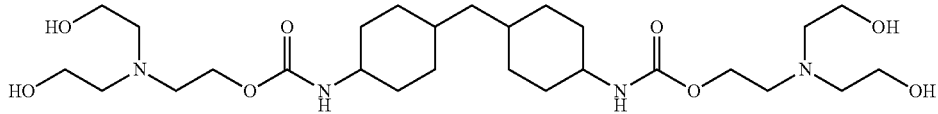

F-2.3

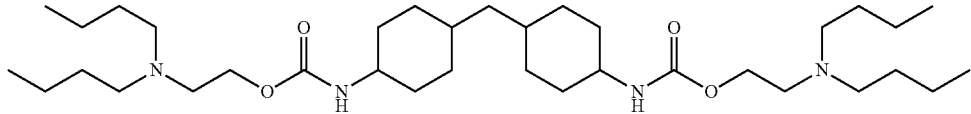

F-2.4

-continued
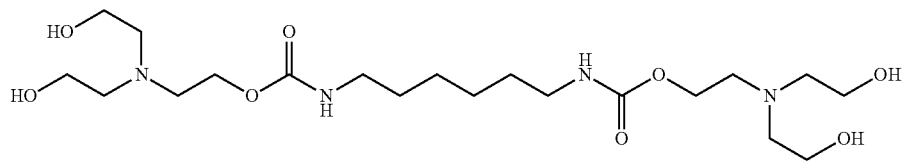
F-2.5
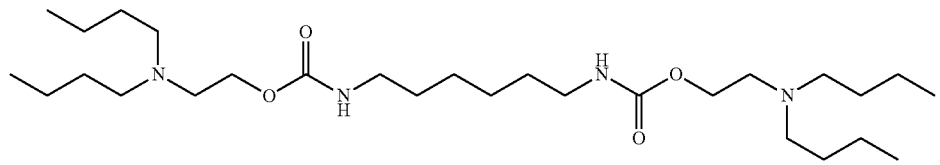
F-2.6
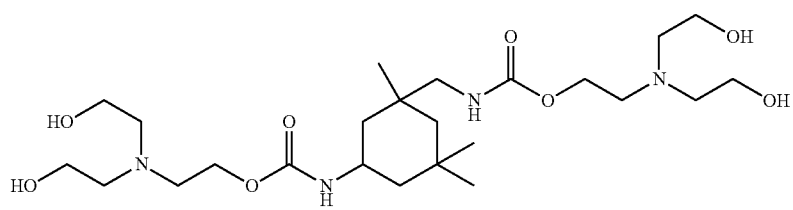
F-2.7
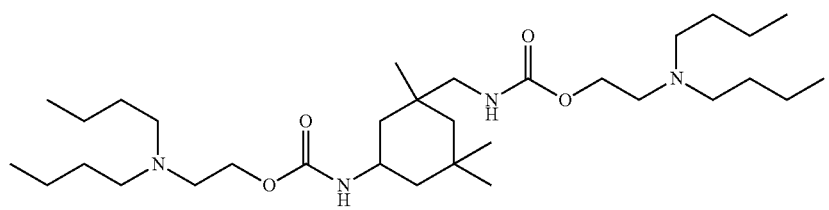
F-2.8
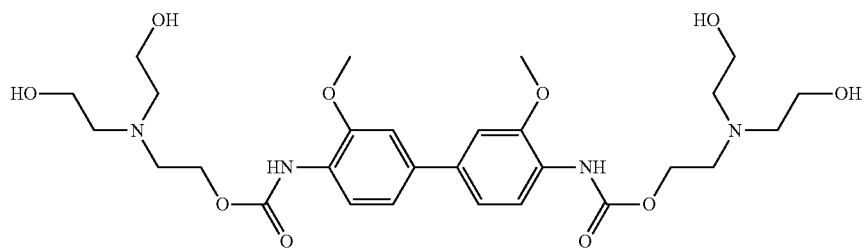
F-2.9
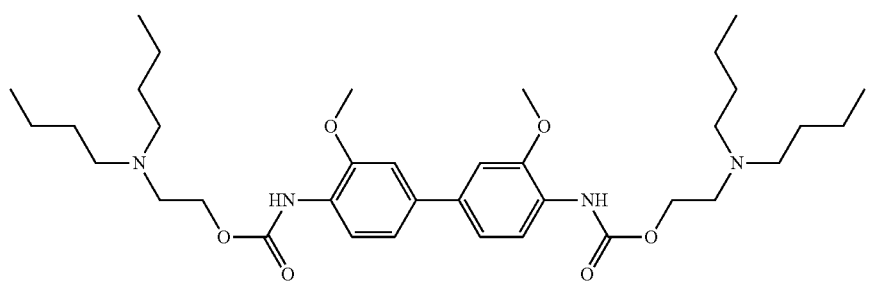
F-2.10
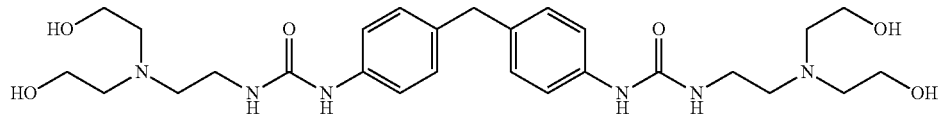
F-3.1
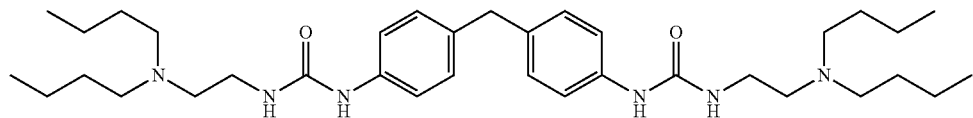
F-3.2

F-3.3
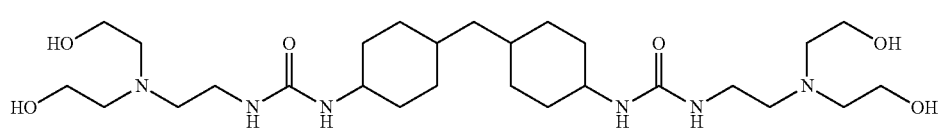
F-3.4
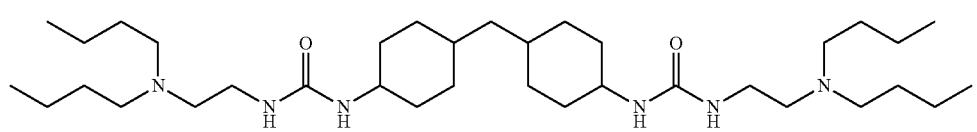
F-3.5
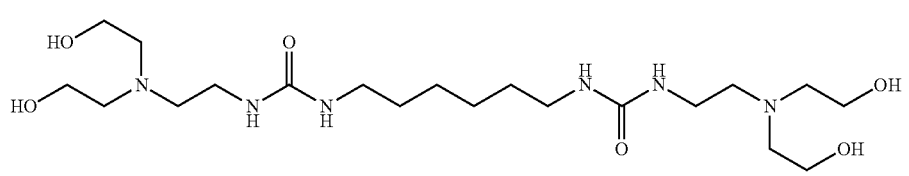
F-3.6
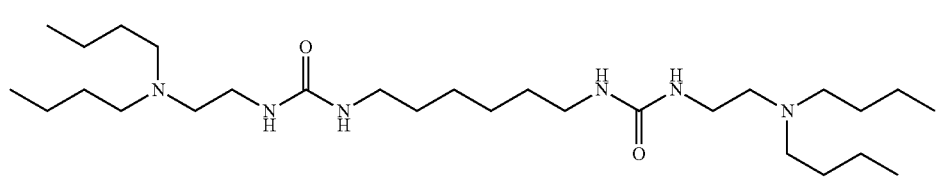
F-3.7
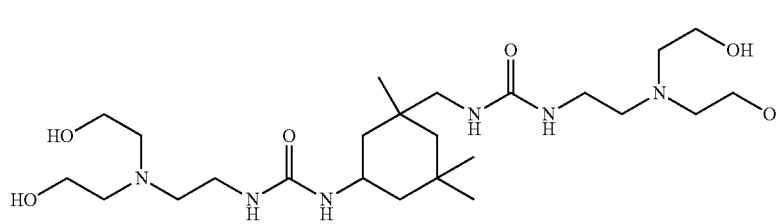
F-3.8
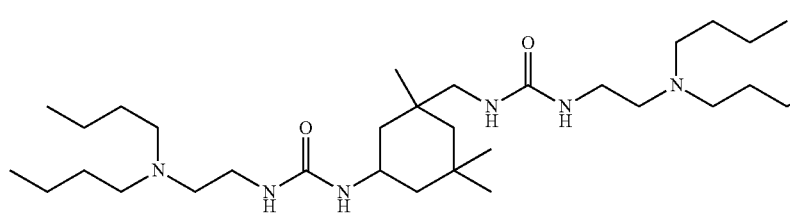
F-4.1
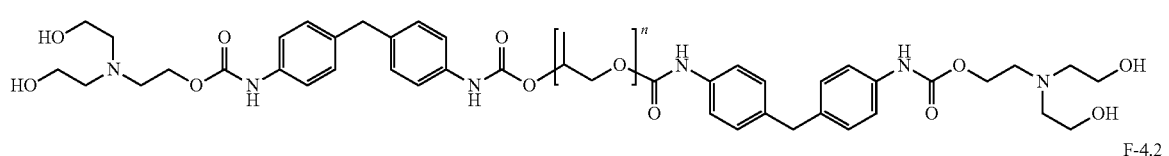
F-4.2
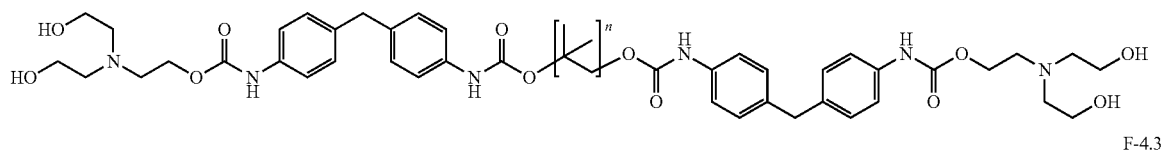
F-4.3
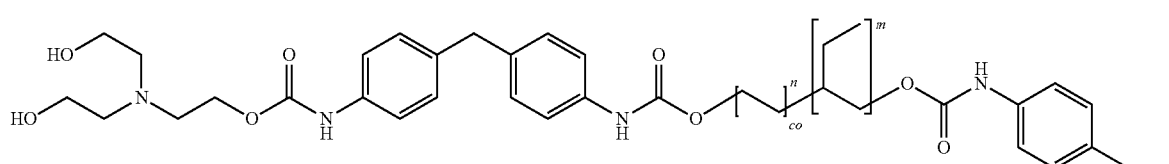

-continued
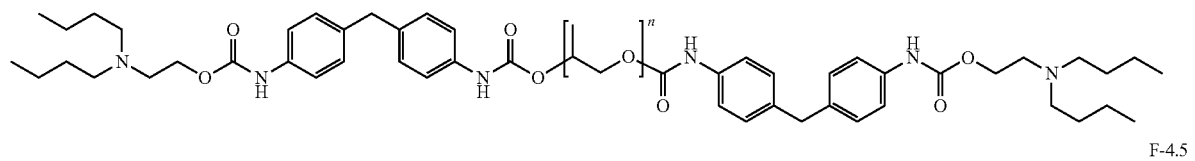
F-4.4
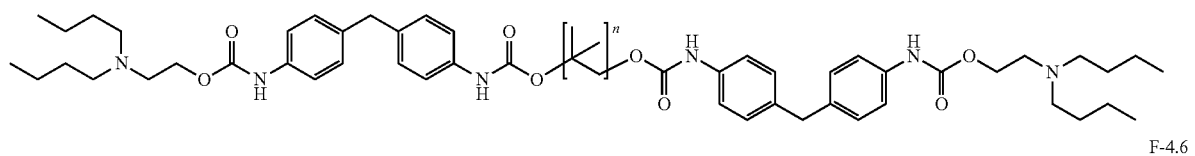
F-4.5
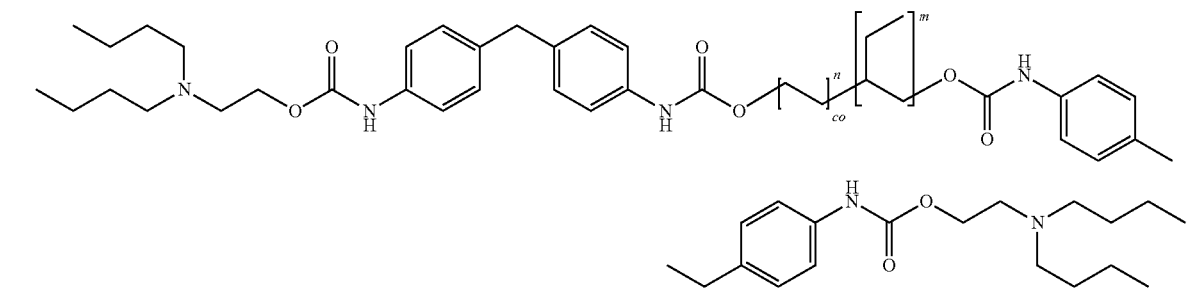
F-4.6
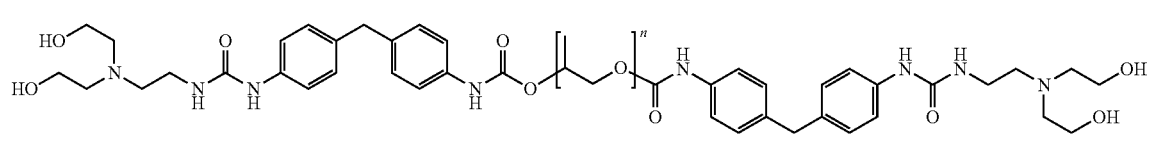
F-4.7
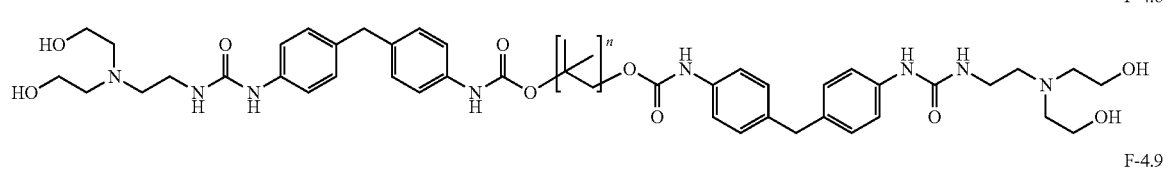
F-4.8
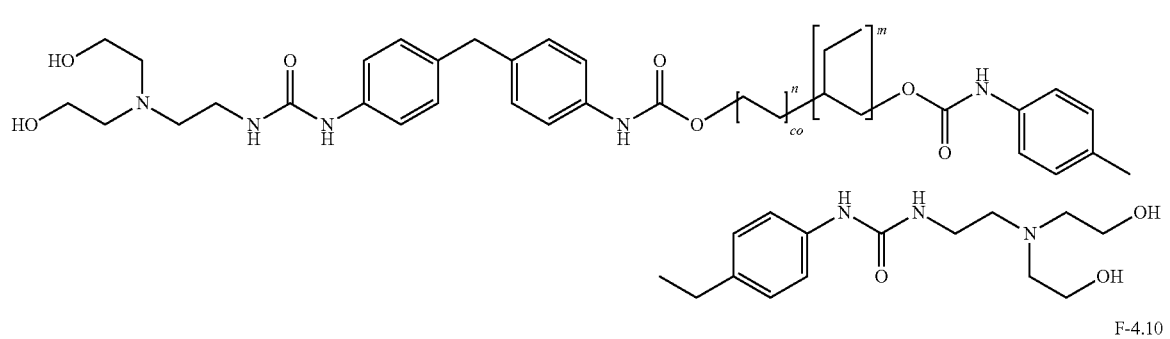
F-4.9
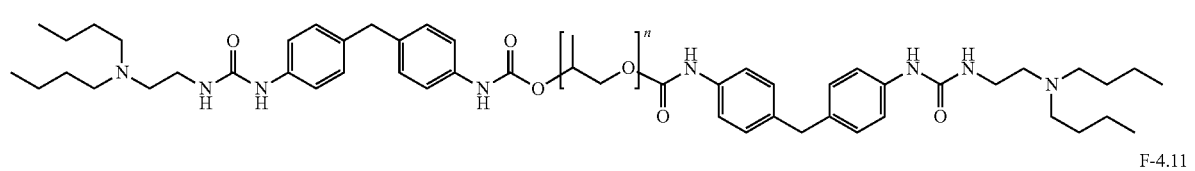
F-4.10
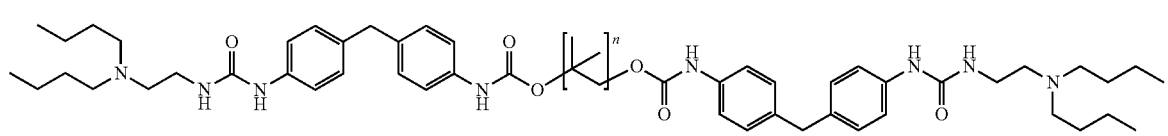
F-4.11

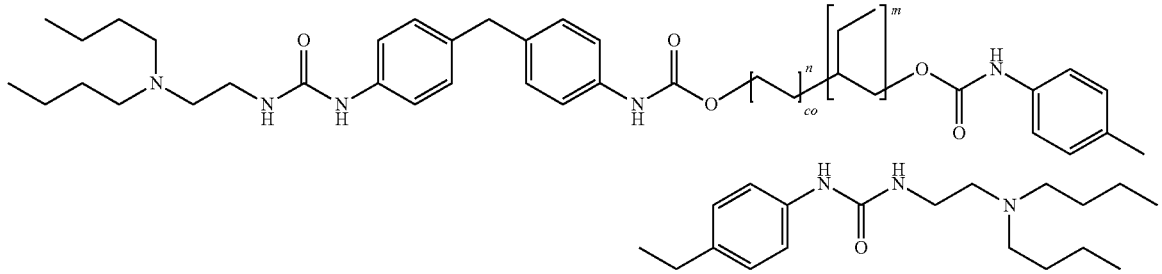

F-4.12

In one preferred embodiment, the material contains at least one reactive group, stable at elevated temperature, but capable of reacting upon non-thermal activation. This enables the fixation of the cured material. Thus, the material can first act e.g. as a carrier means, capable of undergoing a phase transition, imparting the very different viscosity profiles above and below the transition temperature. However, after a final application, it is often a requirement that the material does not have this behaviour anymore, but should be in an irreversible state. This can be obtained by adding reactive groups to the material. They can be either part of A and/or of B, whereas the latter is often, but not always, preferred. However, it is an essential requirement that these groups do not undergo a reaction upon thermal activation, unless stimulated by means described below. This means, that at least about 50° C. above the transition temperature, but preferably about 75° C. or more, more preferably about 100° C. or more, and particularly about 125° C. or more above the transition temperature, the material does not show any curing behaviour for at least some minutes, but preferably some tens of minutes or even hours.

Such reactive groups include, but are not limited to, a primary, secondary and/or tertiary hydroxyl, primary and/or secondary amine, acids, such as carbonic acid, aldehyde, ketone, amide, isocyanate, epoxy, anhydride, imide, carbodiimide, organosilane, alkyl halide, acid halide, lactone, lactam, oxazolinone, aziridine, imine, oxazolidine and/or cyclic carbonate groups, olefinic bonds such as single or different C—C double bonds, which can be conjugated. They can be part of e.g. vinyl- and/or (meth)acrylic residues and/or of alkenes.

The curing of the material containing the reactive groups preferably occurs when the material has obtained its final form after application, which is carried out by known means to the skilled artisan. They include exposure to radicals, oxygen, acid, base, water, catalysts and/or radiation such as UV, Infrared, Near Infrared, X-ray, microwave, electron radiation and/or sonication.

There are no restrictions in making the inventive materials. Indeed, they can be made by any means known by the skilled person. However, one particularly preferred process to make a material, which is capable of forming supramolecular structures below its transition temperature, is reacting at least one isocyanate and/or thioisocyanate with at least one amine, alcohol and/or thiol. There are no further general requirements to the inventive process. However, most typically, the reactants themselves and the product to be obtained define the reaction parameters such as temperature, solvent type and amount, if any, as well as duration of the reaction. The precise process depends on the chemical composition, molecular weight and functionality of the component materials. It can be carried out in bulk, where no solvent is used at all, or in an environment, where just very minor amounts of solvent is helpful or required. Thus, it can be helpful to mix just one of the components, such as isocyanate, amine or alcohol, with a solvent, and the other reactant is added as such. In particular solid raw materials are either preferably dissolved in a solvent, and/or melted before mixing it with the amine and/or the alcohol. Hence, it is possible to make a batch reaction or a reaction where one of the reactants is added to the other one over a period, which can be fast or be extended over hours. Alternatively, it is also possible to make them in any continuous mixing device. Preferred are process conditions where the amount of side products is minimized and the product easily processable, and when dissolved in another media such a solvent, easy separable. Such separation techniques, well known to the skilled person, can be, but are not limited to, precipitation, followed by filtration or centrifugation, evaporation, distillation and/or drum drying.

A big advantage of the current invention is this surprisingly easy and versatile process. Hence, a large variety of materials with different material properties can be made easily. If e.g. alkyl terminated amines or alcohols are used, the material is more hydrophobic then when e.g. hydroxyl terminated reactants are used, hence, the material properties can be easily adapted to the product requirements. For example, by varying the hydrophilicity of the A group, surface active compounds can be obtained and/or the material can easily be optimised as a compatibiliser for other materials. Furthermore, many of the inventive materials can be made with standard raw materials, leading to cost-effective products.

In order to minimise or even avoid oligomerisation and/or polymerisation of the isocyanate with the amine, alcohol and/or thiol, it is often preferred to have an equal molar amount of the isocyanate group and the reagent the isocyanate shall react with.

One preferred embodiment is to carry out the reaction in solvents. Typical solvents are aprotic organic solvents, hence they cannot take part in the reaction. They include all possible solvents—there are no further restrictions to it at all. Such solvents can be, but are not limited to, cyclic, linear and/or branched ethers, hydrocarbons such as alkanes or alkenes, ketones, aromatic solvents such as pyridine, toluene and/or naphthalene, halogenated solvents such as methylenechloride as well as others. It is also possible to use two or more different solvents, or a mixture of one or more different solvents. It is then often an advantage, that the used solvents are at least partly miscible in the chosen concentration ranges. It is important to note that it is not a requirement that the reactants are fully soluble in the solvent. Often a limited solubility is sufficient, hence the remainder of the reactant material is typically dispersed in the reaction media. This can be favourite reaction conditions when the reactant is in solid form, since it is not required to fully dissolve it before starting the reaction. This also allows a controlled reaction, dependant on the dissolution speed of the solid material into the liquid phase.

The concentration of the reactant in the solvent is preferably as high as possible to reduce the amount of solvent which needs to be removed later on. However, in order to reduce the amount of side reactions, it is sometimes helpful to reduce the concentration of the reactant. Hence, it is often preferred to mix the isocyanate in a first solvent at a concentration of lower than about 25 wt.-%, preferably lower than about 15 wt.-%, more preferably lower than about 10 wt.-%, in particular lower than about 5 wt.-%, in which it is fully miscible or dispersible and at least slightly soluble, followed by combining it with the amine and/or the alcohol, which is dissolved or dispersed in a second solvent at a concentration of larger than about 0.1 wt.-%, preferably larger than about 1 wt.-%, more preferably larger than about 5 wt.-%, and in particular larger than about 10 wt.-%, wherein the first and second solvents are organic aprotic solvents and are the same or different, but miscible in the used concentration ranges. The inventive process is flexible regarding the addition mode of the reactants. Hence, it does not play a role which reactant is added first. For continuous synthesis, it is preferred to have the amounts added of each reactant controlled properly to avoid unnecessary side reactions.

While reactions with amines, alcohols and/or mercaptans having one reaction site only are less critical to make, special care has to be taken for the synthesis of materials where reactants, in particular amines, alcohols and/or mercaptanes contain more than one group capable to react with isocyanates. Hence, the addition mode, concentration, temperature as well as the other reaction parameters need to be controlled properly. Although the addition of the reactants can be carried out in some cases fairly fast, such as within minutes, it is often in such cases preferable to have addition cycles of several hours.

Generally, it is preferred to control the reaction in a manner that the obtained purity is good enough that the material can be used without further purification. Such a degree of purity can be as low as 50%, but it is often preferred to be as high as 75%, or even 85%, and in particular 90% or higher. The preferred purification means are the well known means to purify organic materials, such as precipitation and/or extraction.

There are no restrictions regarding the isocyanates which can be used. It is possible to use monoisocyanates such as phenylisocyanate, or, typically organic, polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate and/or its trimer, cyclopentylene-1,3-diisocyanate, cyclo-hexylene-1,4-diisocyanate, cyclohexylene-1,2-diisocyanate, 4,4'-diphenylmethane diisocyanate, 2,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyidiphenyl-methane-2,2', 5,5-tetratetraisocyanate, and the like. While such compounds are commercially available, methods for synthesizing such compounds are well known in the art. In addition, the various isomers of alpha.,.alpha.,.alpha.',-.alpha.'-tetramethyl xylene diisocyanate can be used. Useful aromatic isocyanates include phenylisocyanate, the various isomers of toluene diisocyanate such as 2,4-toluene diisocyanate, 2,6-toluene diisocyanate and/or mixtures of 2,4- and 2,6-toluene diisocyanate and/or its trimer, meta-xylenediioscyanate and para-xylenediisocyanate, 4-chloro-1,3-phenylene diisocyanate, 1,5-tetrahydro-naphthalene diisocyanate, 4,4'-dibenzyl diisocyanate and 1,2,4-benzene triisocyanate, naphthalene-1, 5-diisocyanate, 1-methoxyphenyl-2,4-diisocyanate, 4,4'-diphenylmethane diisocyanate (MDI), 2,4'-diphenylmethane diisocyanate, mixtures of 4,4'-biphenyl diisocyanate, 3,3'-dimethyl-4,4'-biphenyl diisocyanate, 3,3'-dimethyl-4,4'-biphenyl diisocyanate and 3,3'-dimethyidiphenyl methane-4, 4'-diisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate). Suitable polymeric polyisocyanates are such as cycloaliphatic and/or aromatic polyisocyanates and/or polymethylene polyphenylenes polyisocyanates (polymeric MDI). Included within the useable isocyanates are those modifications containing carbodiimide, allophonate, urethane or isocyanurate structures. Unmodified polymeric MDI and mixtures of polymeric MDI and pure 2,4 and 4,4' MDI and carbodiimide modified MDI are preferred. These polyisocyanates are prepared by conventional methods known in the art, e.g. phosgenation of the corresponding organic amine. Particularly preferred isocyanate-containing compounds are phenyl isocyanate, methylenebis(phenyldiisocyanate) (MDI; 2,4'-MDI, 4,4'-MDI and polymeric MDI), isophorone diisocyanate (IPDI) and/or its trimer, toluene diisocyanate (TDI) and/or its trimer, phenyl isocyanate, hydrogenated 4,4'-methylenebis(phenylisocyanate) (HMDI) and/or hexanediisocyanate and/or its trimer and/or tetramethylxylylene diisocyanate.

A wide range of different amines can be used. It is important that they contain besides the primary or secondary amine group, which will react with the isocyanate or thioisocyanate, another heteroatom to fulfil the requirements of B as defined above. However, the mono-functional amines generally have the structure $R_1R_2NH$, where $R_1$ and $R_2$ are independently H or $C_1$ to $C_{22}$ alkyl; $C_6$ to $C_{28}$ aryl, or $C_6$ to $C_{28}$ aralkyl, containing at least one further heteroatom, preferably Nitrogen, Oxygen and/or Sulfur. It includes any group containing a functional group containing such a heteroatom, such as alcohol, primary, secondary, tertiary and/or quaternary amine, ketone, and carboxylic acid substitutions, although ionic groups are less preferred. Preferred mono-functional amines are those that would have low skin irritation if left unreacted in the formulation, such as 2-amino-2-methylpropanol or higher alkyl primary and secondary amines as well primary and secondary alkanolamines. Other examples of suitable linear diamines include the Jeffamine™ range such as the polyoxypropylene diamines available as Jeffamine™ D230, Jeffamine™ D400 and Jeffamine™ D2000 as well as Jeffamine™ EDR-148, a triethylene glycol diamine. Examples of alkyl substitued branched diamines include 2 methyl 1,5 pentane diamine, 2,2,4 trimethyl-1,6 hexane diamine and 2,4,4 trimethyl-1,6 hexane diamine. Cyclic diamines may also be used, such as isophorone diamine, cyclohexane diamine, piperazine and 4,4'-methylene bis(cyclohexyl amine), 4,4'-2,4' and 2,2'-diaminodiphenylmethane, 2,2,4 trimethyl-1,6 hexane diamine, 2,4,4 trimethyl-1,6 hexane diamine and polyoxypropylene diamines. Alkanolamines are compounds containing amine moieties and hydroxyl moieties. Suitable examples of alkanolamines include 2-(methyl amino) ethanol, N-methyidiethanolamine and the like. Suitable examples of compounds containing an amino group and a further group selected from amino and hydroxy include diamines, alkanolamines and amine terminated polyamides or polyethers. Mixtures of such compounds can also be used. The overall urethane diol concentration is in the range of 1 to 99 wt %, more preferably in the range of about 1 to 50 wt % and more preferably in the range of about 2.5 to 25 wt % although this is not limiting. Trialkanolamine, triethanolamine, triisopropanolamine. Useful polyfunctional amines include piperazine, tris(2-aminoethyl)amine, and amine terminated polyethers such as JEFFAMINE D230 and JEFFAMINE D400 from Huntsman Corporation, Salt Lake City, Utah. Furthermore, primary and/or secondary amines, such as aliphatic amines (e.g., 1,2-diaminoethane), oligomers of 1,2-diaminoethane (for example, diethylenetriamine, triethylenetetramine or pentaethylenehexamine). Particularly Preferred amines include dialkanolamine such as diethanolamine, N-(2-aminoalkyl)dialkanolamine, such as N-(2-aminoethyl) diethanolamine and/or N-(2-aminoethyl)dibutylamine and cyclic structures such as 1-(2-aminoethyl)piperazine.

Any alcohol can be used to practice the invention, as long as it contains a further heteroatom to fulfill the requirements for B. This includes diethylene glycol, dipropylene glycol, trimethylene glycol, triethylene glycol, 1,1,1-trimethyol propane, 1,1,1-trimethylol ethane, 1,2,6-hexane triol, o-methyl glucoside, pentaerythritol, sorbitol, and sucrose, fructose, glucose or any other sugar alcohol, triethanolamine, diethylene glycol, dipropylene glycol, triethylene glycol, tripropylene glycol, glycerol, trimethylolpropane, polyhydric alcohols having from 2 to 15 carbon atoms with one or more polycarboxylic acids having from 2 to 14 carbon atoms. Examples of suitable polyhydric alcohols include glycerol, pentaerythritol, trimethylolpropane, 1,4,6-octanetriol, glycerol monoallyl ether, glycerol monoethyl ether, 2-ethylhexanediol-1,4, cyclohexanediol-1,4, 1,2,6-hexanetriol, 1,3,5-hexanetriol, 1,3-bis-(2-hydroxyethoxy)propane and the like. It is also possible to use polyols such as polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, triethylene glycol, dipropylene glycol, triethylene glycol, 2-ethylhexanediol-1, 3, glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide. A number of suitable polyols are commercially available. Non-limiting examples include Voranol P400, P725, P1000, P2000, P4000 (Dow). Non-limiting commercially available polyester polyols that may be used in the practise of the invention include Dynacol 7360, 7380, 7381 (Degussa-Huls), Rucoflex S-105-30 (Bayer) and Stepanpol PN110 (Stepan). Suitable polyoxyethylene/polyoxpropylene copolymers and polyoxypropylene adducts are polyether polyols having a functionality of at least two. Preferred alcohols include trialkanolamine, such as triethanolamine, dialkylalkanolamine, such as dialkylethanolamine and/or dibutylethanolamine, 4-(2-Hydroxyethyl)morpholine, diethylene glycol, triethylene glycol, and/or bis(O,O'-2-aminoethyl)ethyleneglycol, glycerol and derivatives, trimethylolpropane and alkoxylated derivatives, pentaerythritol and alkoxylated derivatives, dipentaerythritol and alkoxylated derivatives, tripentaerythritol and alkoxylated derivatives 1,4,6-octanetriol, 1,2,6-hexanetriol, sucrose, glucose, frusctose, polyether triols, propoxylated ethylene diamine, propoxylated diethylene triamine and/or Mannich polyols.

Useful thiols or mercaptanes are aliphatic thiols including alkane, alkene and alkyne thiols having at least two or more —SH groups, such as polythiols such as 2,2'-oxytris(ethane thiol) and di- and tri-mercaptopropionate esters of poly(oxyethylene) diols thiodiglycol, as well as triols. However, it is also possible to have monomercaptanes and/or thioethers having at least one other heteroatom, preferable Nitrogen and/or Oxygen. In case of a thioether, it is important that the molecule has at least one group capable of reacting with the isocyanate, such as an alcohol and/or an ether. Furthermore, it is also possible to use Silicone polyols and/or polyamines and/or perflouroalkyl functional polyols, trimethylol propane tris(3-mercaptopropionate), pentaerythritol tetrakis(3-mercaptopropionate), dipentaerythritol hexakis(thioglycollate), tripentaerythritol octakis(thioglycollate).

The inventive material can be used very widely. The most typical applications make use of the supramolecular behaviour of the inventive material, since it imparts very different properties at temperatures below its transition temperature compared to above. However, the use of these materials is not limited to these uses. In particular, if the material has further specific features such as e.g. tackiness and/or adhesive properties, the material can be used as such. However, a preferred use is that the material is first in a state of below its transition temperature, followed by increasing the temperature to around or above its transition temperature, carrying out a process step and subsequently decrease the temperature below the transition temperature. Hence, the material behaves first as a solid and upon increasing the temperature, the viscosity is lowered. The big advantage of these materials is that the transition temperature range is fairly broad, thus enabling to adjust basically any viscosity between the maximum and minimum viscosity by selecting the appropriate temperature.

Such a process step can be basically any process step. One particularly preferred one is blending the material with another material, in particular with polymers, other supramolecular material, oligomers, monomers, plasticizers, tackifiers, solvents, diluents, dyes, pigments, surfactants, and/or catalysts. Another preferred process step is applying the material to a substrate, in particular paper, coated paper, wood, metal, plastic, fabric, textiles, fibres and/or various composite materials, cellulose, aluminium, tin, steel, copper, polystyrene, acrylic, polycarbonate, PVC, polyolefin such as polypropylene and/or polyethylene, ABS, polyester, PET, PEN, polyamide, nylon, polyurethane, whereas the surfaces might have undergone a surface treatment known in the art such as applying primers, flame treatment, plasma treatment such as air plasma treatment, and/or corona treatment. A further preferred process step is encapsulating another material, with can then be released at different conditions. Such other materials are in particular pharmaceutical, agrochemical and/or antiseptic compounds, antifungicides, catalysts, fragrances, drugs and/or dyes.

Furthermore, the inventive material can be used in many ways. Non-limiting examples include the use of the inventive material as one or two-component adhesives, in particular hot melt adhesives, reactive hot melt adhesives, pressures sensitive adhesives, structural adhesives, liquid adhesives and/or contact adhesives, inks, in particular inks for packaging and/or inks for electronic applications such as imaging, photography and/or inkjet inks, furthermore protective, decorative and functional coatings, in particular paints, varnishes and/or flooring, furthermore it can be used in extrusion products, injection mouldings, blow mouldings, reactive injection moulding, foam, elastomers, surfactants, rheology modifiers, materials for use in electronics applications, in particular semiconductor packaging and microelectronic assemblies, circuit materials, conformal coatings, thermal management materials, component assembly in, electronic devices, printed circuit boards, computer components and/or flat panel displays; personal care applications such as use in hair sprays, shampoos, conditioners, lotions, sunscreens, skin care preparations and cosmetics as encapsulation material, such as for drug delivery and/or catalyst release.

This invention can be illustrated by the following non-limiting examples.

GENERAL EXPERIMENTAL

All the reagents were purchased from Aldrich the Chemical Company, Lancaster and Acros Chimica, and were used as received without any further purification. The different solvents used were dried by distillation under an inert atmosphere, tetrahydrofuran (THF) from sodium benzophenone ketyl, acetone from anhydrous calcium sulfate, dichloromethane ($CH_2Cl_2$) from calcium hydride and ethanol from 4 Å molecular sieves. Thin-layer chromatography (TLC) was performed on aluminium sheets (10×5 cm) coated with Merck 5735 Kieselgel 60 F. The development of the plates was performed under a UV lamp (wavelength, $\lambda$=365 and 254 nm) and if necessary stained with potassium permanganate solution. Sorbisil 60 (0.040-0.063 mm mesh, Merck 9385) was used to perform column chromatography. Melting points of MDI carbamate esters were obtained from DSC scans and are presented as an onset points. The $^1$H nuclear magnetic resonance (NMR) spectra were performed on Bruker AC250 (250 MHz) or Bruker AMX400 (400 MHz) spectrometers (using the deuterated solvent as lock and residual solvent or tetramethylsilane as internal reference). The $^{13}$C nuclear magnetic resonance (NMR) spectra were performed on a Bruker AC250 (62.5 MHz) or Bruker AMX400 (100 MHz) spectrometers. Infrared (IR) spectroscopic analyses were performed on Perkin-Elmer Infrared Fourier Transform spectrometer 1720-X using KBr discs for the preparation of samples, unless otherwise stated. Low-resolution mass spectra were performed using a Micromass liquid chromatography mass spectrometer (LC-MS), with a Waters 996 photodiode array detector and a Hewlett Packard series 1050 pump. Data was acquired on MassLynx (version 3.5) software. Differential scanning calorimetry (DSC) was performed on a TA Instruments DSC 2920 differential scanning calorimeter. DSC was performed scanning from −50° C. to 150° C. and from 30° C. to 200° C. at a rate of 3° C./min modulated. All of the thermal analysis data was analysed using TA Instruments universal analysis software. DSC analysis involved software controlled smoothing (15°) of the derivative (differential) of complex $C_p$. Thermal stability was evaluated using a TA instruments Hi-Res TGA 2950 thermo-gravimetric analyser, monitoring sample weight as a function of temperature by heating a sample from ambient temperature to 500° C. at a rate of 10° C. per minute. Rheology was evaluated using a TA Instruments AR 2000 rheometer in oscillatory mode with 0.1% strain and an angular frequency of 10 radians per second using parallel plates at a cooling rate of 3° C. per minute.

Example 1

Comparisons

Example 1.1

Synthesis of 4,4'-Methylenebis(Phenyl-Carbamic Acid 2-Methyl Ester and Characterisation Dry methanol (~50 ml) was added into a flask containing MDI (2.50 g, 10 mmol) and the mixture stirred for 3 hours. The excess solvent was removed in vacuo to yield pure product as a white solid (3.01 g, 96%); m.p. 188° C.; $^1$H NMR (DMSO) δ 3.64 (s, 6H, 2×$CH_3$), 3.79 (s, 2H, ArCH$_2$Ar), 7.08-7.11 (AA'XX', 4H, 4×ArH), 7.33-7.36 (AA'XX', 4H, 4×ArH), 9.55 (s, 2H, 2×NH); $^{13}$C NMR (DMSO) δ 48.95 ($CH_3$), 51.87 (CH2), 118.69 (ArC), 129.20 (ArC), 135.84 (ArC), 137.40 (ArC), 154.35 ($CO_2$).

Example 1.2

Synthesis of 4,4'-Methylenebis(Phenyl-Carbamic Acid Ethyl Ester) and Characterisation To a solution of MDI (2.50 g, 10 mmol) in dry THF (10 ml) was added ethanol (30 ml). This was stirred at room temperature for 2 hours. The solvent was then removed in vacuo to yield a white solid. This was purified by chromatographic separation on silica with ethyl acetate as the eluent. The obtained product was a white solid (3.20 g, 94%); m.p. 134° C.; IR (THF, KBr) $v_{max}$/cm$^{-1}$ 2974 (C—H), 2860 (C—H), 1733 (C═O); $^1$H NMR (CDCl$_3$) δ 1.26-1.32 (t, 6H, 2×$CH_3$, J=7.0), 3.87 (s, 2H, ArCH$_2$Ar, J=7.0), 6.66 (br s, 2H, NH), 7.06-7.11 (AA'XX', 4H, ArH), 7.25-7.30 (AA'XX', 4H, ArH); $^{13}$C NMR (CDCl$_3$) δ 14.97 ($CH_3$), 40.93 ($OCH_2$), 61.58 (ArCH$_2$Ar), 119.34 (ArC), 129.80 (ArC), 136.44 (ArC), 136.65 (ArC), 154.15 (C═O).

Example 1.3

Synthesis of 4,4'-Methylenebis(Phenyl-Carbamic Acid N-Propyl Ester) and Characterisation To a solution of MDI (2.00 g, 8 mmol) in dry THF (10 ml), was added n-propanol (20 ml). This was stirred at room temperature for 2 hours. The solvent was then removed in vacuo and the resultant white solid was purified by chromatographic separation on silica with ethyl acetate as the eluent. This afforded product as a white solid, (2.30 g, 78%); m.p. 120° C.; IR (THF, KBr) $v_{max}$/cm$^{-1}$ 2974 (C—H), 2861 (C—H), 1733 (C═O); $^1$H NMR (d$_6$-DMSO) δ 0.89-0.95 (t, 6H, 2×$CH_3$, J=7.5), 1.55-1.69 (m, 4H, 2×$CH_2$), 3.78 (s, 2H, ArCH$_2$Ar), 3.98-4.03 (t, 4H, 2×$OCH_2$, J=7.0), 7.07-7.11 (AA'XX', 4H, 2×ArH), 7.34-7.37 (AA'XX', 4H, 2×ArH), 9.52 (s, 2H, 2×NH); $^{13}$C NMR (d$_6$-DMSO) δ 10.62 ($CH_3$+

CH$_2$), 22.26 (OCH$_2$), 65.91 (ArCH$_2$Ar), 118.66 (ArC), 129.18 (ArC), 135.76 (ArC), 137.49 (ArC), 154.00 (C=O).

Example 1.4

Synthesis of 4,4'-Methylenebis(Phenyl-Carbamic Acid Isopropyl Ester) and Characterisation To a solution of MDI (2.00 g, 8 mmol) in dry THF (10 ml), was added isopropanol (20 ml). This was stirred at room temperature for two hours. The solvent was then removed in vacuo to yield pure product as a white solid, (2.77 g, 94%); m.p. 152° C.; IR (THF, KBr) $v_{max}$/cm$^{-1}$ 2975 (C—H), 2861 (C—H), 1730 (C=O); $^1$H NMR (CDCl$_3$) δ 1.27-1.29 (d, 12H, 4×CH$_3$, J=6.5), 3.87 (s, 2H, CH$_2$), 4.95-5.05 (m, 2H, CH), 6.54 (s, 2H, 2×NH), 7.07-7.10 (AA'XX', 4H, 4×ArH), 7.26-7.30 (AA'XX', 4H, 4×ArH); $^{13}$C NMR (CDCl$_3$) δ22.51 (CH$_3$), 40.93 (OCH), 69.06 (ArCH$_2$Ar), 119.23 (ArC), 129.80 (2×ArC), 136.54 (ArC), 153.72 (C=O).

Example 1.5

Synthesis of 4,4'-Methylenebis(Phenyl-Carbamic Acid N-Butyl Ester) and Characterisation To a solution of MDI (2.00 g, 8 mmol) in dry THF (10 ml), was added n-butanol (20 ml). This was stirred at room temperature for two hours. A proportion of the solvent was then removed in vacuo and the resultant white oily solid was purified by chromatographic separation on silica with ethyl acetate as the eluent. This afforded product as a white solid (2.67 g, 84%); m.p. 117° C.; IR (THF, KBr) $v_{max}$/cm$^{-1}$ 2974 (C—H), 2860 (C—H), 1733 (C=O); $^1$H NMR (CDCl$_3$) δ 0.91-0.97 (t, 6H, 2×CH$_3$, J=7.5), 1.39-1.48 (m, 4H, 2×CH$_2$), 1.59-1.70 (m, 4H, 2×CH$_2$), 3.88 (s, 2H, ArCH$_2$Ar), 4.12-4.18 (t, 4H, 2×CH$_2$, J=6.5), 6.57 (s, 2H, 2×NH), 7.07-7.11 (AA'XX', 4H, 4×ArH), 7.27-7.30 (AA'XX', 4H, 4×ArH); $^{13}$C NMR (CDCl$_3$) δ 10.62 (CH$_3$), 10.79 (CH$_2$), 22.26 (CH$_2$), 25.99 (OCH$_2$), 65.91 (ArCH$_2$Ar), 118.66 (ArC), 129.17 (ArC), 135.75 (ArC), 137.49 (ArC), 154.00 (C=O).

Example 1.6

Synthesis of 4,4'-Methylenebis(Phenyl-Carbamic Acid T-Butyl Ester) and Characterisation To a flask containing MDI (2.5 g, 10 mmol) was added t-butanol (20 ml) and the mixture stirred 50° C. for four hours. A white suspension was formed and this was filtered under vacuum. The resultant white solid was washed with ether and filtered again under vacuum. The white solid was then purified by chromatographic separation on silica with ethyl acetate as the eluent. This afforded product as a white solid (1.17 g, 29%); m.p. 188° C.; IR (THF, KBr) $v_{max}$/cm$^{-1}$ 2974 (C—H), 2861 (C—H), 1727 (C=O) $^1$H NMR (d$_6$-DMSO) δ 1.51 (s, 18H, 6×CH$_3$), 3.82 (s, 2H, ArCH$_2$Ar), 7.10-7.13 (AA'XX', 4H, 4×ArH), 7.38-7.41 (AA'XX', 4H, 4×ArH); $^{13}$C NMR (CDCl$_3$) δ 28.74 (CH$_3$), 40.90 (C—O), 81.07 (ArCH$_2$Ar), 119.14 (ArC), 129.76 (ArC), 136.38 (ArC), 136.73 (ArC), 153.50 (C=O).

Example 1.7

Synthesis of 4,4' Methylenebis(Phenyl-Carbamic Acid N-Hexyl Ester) and Characterisation To a solution of MDI (2.00 g, 8 mmol) in dry THF (10 ml) was added n-hexanol (3.30 ml, 32 mmol). This was stirred at room temperature for two hours. The solvent was then removed in vacuo and the resultant white solid was purified by chromatographic separation on silica with ethyl acetate as the eluent. This afforded product as a white solid (1.98 g, 54%); m.p. 108° C.; IR (THF, KBr) $v_{max}$/cm$^{-1}$ 2975 (C—H), 2861 (C—H), 1734 (C=O); $^1$H NMR (CDCl$_3$) δ 0.87-0.92 (t, 6H, 2×CH$_3$, J=6.5), 1.26-1.43 (m, 12H, 6×CH$_2$), 1.60-1.69 (m, 4H, 2×CH$_2$), 3.88 (s, 2H, ArCH$_2$Ar), 4.11-4.17 (t, 4H, 2×CH$_2$, J=6.5), 6.55 (s, 2H, 2×NH), 7.08-7.11 (AA'XX', 4H, 4×ArH), 7.27-7.30 (AA'XX', 4H, 4×ArH); $^{13}$C NMR (CDCl$_3$) δ 14.43 (CH$_3$), 22.96 (CH$_2$), 25.94 (CH$_2$), 29.30 (CH$_2$), 31.86 (CH$_2$), 40.93 (CH$_2$), 65.80 (ArCH$_2$Ar), 119.25 (ArC), 129.82 (ArC), 136.42 (ArC), 136.64 (ArC), 153.93 (C=O).

Example 1.8

Synthesis of 4,4'-Methylenebis(Phenyl-Carbamic Acid Cyclohexyl Ester) and Characterisation To a solution of MDI (2.00 g, 8 mmol) in dry THF (10 ml) was added cyclohexanol (3.30 ml, 32 mmol). This was stirred at room temperature for two hours. The solvent was then removed in vacuo and the resultant white solid was purified by chromatographic separation on silica with ethyl acetate as the eluent. This afforded product as a white solid (2.82 g, 78%); m.p. 142° C.; IR (THF, KBr) $v_{max}$/cm$^{-1}$ 2973 (C—H), 2857 (C—H) 1728 (C=O); $^1$H NMR (CDCl$_3$) δ 1.18-1.95 (m, 20H, 10×CH$_2$), 3.87 (s, 2H, ArCH$_2$Ar), 4.68-4.77 (m, 2H, 2×CH), 6.53 (s, 2H, 2×NH), 7.07-7.11 (AA'XX', 4H, 4×ArH), 7.27-7.30 (AA'XX', 4H, 4×ArH,); $^{13}$C NMR (CDCl$_3$) δ 24.19 (CH$_3$), 25.78 (CH$_2$), 32.33 (CH$_2$), 40.92 (OCH$_2$), 73.98 (ArCH$_2$Ar), 119.16 (ArC), 129.81 (ArC), 136.52 (ArC), 136.56 (ArC), 153.65 (C=O).

TABLE 1

Overview of Comparisons made according to the general description from Example 1.

| Exp. No. | Alcohol Type | [ml] | Isocyanate Type | [g] | Obtained Product | Yield [%] | mp [° C.] |
|---|---|---|---|---|---|---|---|
| 1.1 | Methanol | 50 | MDI | 2.50 | 4,4'-Methylene-bis(phenyl-carbamic acid 2-methyl ester) | 96 | 188 |
| 1.2 | Ethanol | 30 | MDI | 2.50 | 4,4'-Methylene-bis(phenyl-carbamic acid ethyl ester) | 94 | 134 |
| 1.3 | n-propanol | 20 | MDI | 2.00 | 4,4'-Methylene-bis(phenyl-carbamic acid n-propyl ester) | 78 | 120 |
| 1.4 | i-propanol | 20 | MDI | 2.00 | 4,4'-Methylene-bis(phenyl-carbamic acid i-propyl ester) | 94 | 152 |

TABLE 1-continued

Overview of Comparisons made according to the general description from Example 1.

| Exp. No. | Alcohol Type | [ml] | Isocyanate Type | [g] | Obtained Product | Yield [%] | mp [° C.] |
|---|---|---|---|---|---|---|---|
| 1.5 | n-butanol | 20 | MDI | 2.00 | 4,4'-Methylene-bis(phenyl-carbamic acid n-butyl ester) | 84 | 117 |
| 1.6 | t-butanol | 10 | MDI | 2.50 | 4,4'-Methylene-bis(phenyl-carbamic acid t-butyl ester) | 29 | 188 |
| 1.7 | n-hexanol | 3.3 | MDI | 2.00 | 4,4'-Methylene-bis(phenyl-carbamic acid n-hexyl ester) | 54 | 108 |
| 1.8 | Cyclo-hexanol | 3.3 | MDI | 2.00 | 4,4'-Methylene-bis(phenyl-carbamic acid cyclohexyl ester) | 78 | 142 |

All these materials did not show any indication of having a supramolecular behaviour, as confirmed by DSC measurements. There was just the melting points observed, as indicated above.

Example 2

Urethane Examples

General Experimental Procedure for the Synthesis of Hydroxyl Terminated Bis-Urethanes.

To a solution of triethanolamine (3.04 g, 20.4 mmol) in dry THF (25 ml) under an argon atmosphere maintained under reflux was added in a dropwise fashion a solution of a bis-isocyanate (10.0 mmol) in dry THF (75 ml) over a period of approximately 90 minutes. This mixture was then heated and stirred for 1 hour and then allowed to cool to room temperature. The reaction was then poured into n-pentane (350 ml) that was cooled down to −78° C. A white precipitate formed which was filtered off under vacuum. This material was repreciptated from n-pentane a further two times and the residual solvent was removed under high vacuum to yield the desired product.

General Experimental Procedure for the Synthesis of Butyl Terminated Bis-Urethanes.

To a solution of a bis-isocyanate (10.0 mmol) in dry THF (50 ml) under an argon atmosphere maintained under reflux was added a solution of N-dibutylaminoethanol (4.23 ml, 21.0 mmol) in dry THF. The reaction mixture was stirred and heated for a period of 12 hours and then allowed to cool to room temperature. The solution was concentrated in vacuo to yield a clear oil.

TABLE 2

Types and amounts of alcohols and isocyanates for the synthesised Urethanes (or Carbamates).

| Exp. No. | Alcohol Type | Amount | Isocyanate Type | Amount | Obtained Product [g] | Yield [%] |
|---|---|---|---|---|---|---|
| 2.1 | Triethanolamine | 3.04 g | MDI [a] | 2.50 g | F-2.1 | 64 |
| 2.2 | N,N-dibutylethanolamine | 4.40 ml | MDI [a] | 2.50 g | F-2.2 | 99 |
| 2.3 | Triethanolamine | 3.09 g | HMDI [b] | 2.50 ml | F-2.3 | 76 |
| 2.4 | N,N-dibutylethanolamine | 4.50 ml | HMDI [b] | 2.50 ml | F-2.4 | 81 |
| 2.5 | Triethanolamine | 4.70 g | HDI [c] | 2.50 ml | F-2.5 | 92 |
| 2.6 | N,N-dibutylethanolamine | 6.29 ml | HDI [c] | 2.50 ml | F-2.6 | 96 |
| 2.7 | Triethanolamine | 4.32 g | IPDI [d] | 2.49 g | F-2.7 | 90 |
| 2.8 | N,N-dibutylethanolamine | 7.14 ml | IPDI [d] | 2.50 g | F-2.8 | 67 |
| 2.9 | Triethanolamine | 2.57 g | MBPD [e] | 2.50 g | F-2.9 | 84 |
| 2.10 | N,N-dibutylethanolamine | 3.74 ml | MBPD [e] | 2.50 g | F-2.10 | 81 |

[a] MDI stands for 4,4'-methylenebis(phenylisocyanate)
[b] HMDI stands for hydrogenated 4,4'-methylenebis(phenylisocyanate)
[c] HDI stands for hexane diisocyanate
[d] IPDI stands for isophorone diisocyanate
[e] MBPD stands for 3,3'-Methyoxy-4,4'-biphenylenediisocyanate
[f] The formula are shown in the appendix

Example 2.1

Synthesis of 4,4'-Methylenebis(Phenyl-Carbamic Acid 2-[Bis-(2-Hydroxyethyl)-Amino]-Ethyl Ester) (Formula F-2.1) and Characterisation The obtained product was a white solid which upon exposure to air and moisture changed the physical form to a transparent gel. IR (Thin Film, KBr) $v_{max}$/cm$^{-1}$ 3313, 2957, 1702, 1601, 1540; $^1$H NMR (d$_6$-DMSO) δ 2.57-2.62 (m, 8H, 4×CH$_2$), 2.77-2.82 (m, 4H, 2×CH$_2$), 3.39-3.46 (m, 8H, 4×CH$_2$), 3.78 (s, 2H, 1×CH$_2$), 4.06-4.11 (m, 4H, 2×CH$_2$) 4.33-4.37 (m, 4H, 4×OH), 7.07-7.11 (AA'XX' system, 4H, 2×ArH), 7.34-7.37 (AA'XX' system, 4H, 2×ArH), 9.52 (s, 2H, 2×NH); $^{13}$C NMR (d$_6$-DMSO) δ 53.87 (CH$_2$), 57.29 (CH$_2$), 59.70 (CH$_2$), 62.70 (CH$_2$), 67.37 (ArCH$_2$Ar), 118.74 (ArC), 129.18 (ArC), 135.81 (ArC), 134.45 (ArC), 153.93 (NCO$_2$); LCMS calcd for C$_{27}$H$_{40}$N$_4$O$_8$ [M+H]$^+$: m/z 548.2846. found m/z 549 [(M+H)$^+$, 50%].

Example 2.2

Synthesis of 4,4'-Methylenebis(Phenyl-Carbamic Acid 2-[Bis-Butyl-Amino]-Ethyl Ester) (Formula F-2.2) and Characterisation The obtained product was purified by chromatography (silica; 90:10 dichloromethane:methanol) to obtain a colourless oil. IR (THF, KBr) $v_{max}$/cm$^{-1}$ 2959, 1730, 1616, 1522; $^1$H NMR (CDCl$_3$) δ 0.80-0.86 (m, 12H, 4×CH$_3$), 1.15-1.42 (m, 16H, 8×CH$_2$), 2.37-2.43 (m, 8H, 4×NCH$_2$), 2.62-2.67 (t, 4H, 2×CH$_2$N, J=6.1), 3.81 (s, 2H, ArCH$_2$Ar), 4.10-4.15 (t, 4H, 2×OCH$_2$, J=6.1), 6.58 (s, 2H, 2×NH), 7.00-7.03 (AA'XX' system, 4H, 4×ArH), 7.19-7.22 (AA'XX system, 4H, 4×ArH); $^{13}$C NMR (d$_6$-DMSO) δ 14.49 (CH$_2$), 21.04 (CH$_2$), 29.59 (CH$_2$), 40.94 (CH$_2$), 53.03 (CH$_2$), 54.82 (CH$_2$), 63.66 (ArCH$_2$Ar), 119.32 (ArC), 129.79 (ArC), 136.37 (ArC), 136.38 (ArC), 154.06 (CO$_2$); LCMS calcd for C$_{35}$H$_{56}$N$_4$O$_4$ [M+H]$^+$: m/z 596.4302. found m/z 597 [(M+H)$^+$, 100)], 441 [(M+H)$^+$−(C$_4$H$_9$)$_2$NC$_2$H$_4$, 18].

Example 2.3

Synthesis of 4,4'-Methylenebis(Cyclohexyl-Carbamic Acid 2-[Bis-(2-Hydroxyethyl)-Amino]-Ethyl Ester) (Formula F-2.3) and Characterisation IR (CDCl$_3$, KBr) $v_{max}$/cm$^{-1}$ 3441 (O—H), 3019 (N—H), 2933 (C—H), 1707 (C=O), 1510 (C—N), 1216 (C—O); $^1$H NMR (d$_6$-DMSO) δ 1.06-1.09 (m, 2H, 2×CH), 1.35-1.38 (m, 8H, 4×CH$_2$), 1.44-1.48 (m, 10H, 5×CH$_2$), 1.73-1.75 (m, 2H, 2×CH), 2.54-2.59 (m, 8H, 4×CH$_2$), 2.68-2.71 (m, 4H, 2×CH$_2$), 3.38-3.43 (m, 8H, 4×CH$_2$), 3.94-4.01 (m, 4H, 2×OCH$_2$), 4.32 (s, 4H, 4×OH), 6.97-7.00 (d, 2H, 2×NH, J=7.42); LCMS calcd for C$_{27}$H$_{52}$N$_4$O$_8$ [M+H]$^+$: m/z 560.3785. found m/z 561 [(M+H)$^+$, 50%].

Example 2.4

Synthesis of 4,4'-Methylenebis(Cyclohexyl-Carbamic Acid 2-[Bis-Butyl-Amino]-Ethyl Ester) (Formula F-2.4) and Characterisation IR (CHCl$_3$, KBr) $v_{max}$/cm$^{-1}$ 3017, 2932, 1708, 1510, 1216; $^1$H NMR (CDCl$_3$) δ 0.88-0.93 (m, 12H, 4×CH$_3$), 1.27-1.30 (m, 8H, 4×CH$_2$), 1.33-1.39 (m, 18H, 9×CH$_2$), 1.40-1.42 (m, 8H, 4×CH$_2$), 1.44-1.46 (m, 2H, 2×CH), 2.43-2.48 (m, 8H, 4×CH$_2$), 2.65-2.69 (m, 4H, 2×CH$_2$), 3.78 (s, 2H, 2×NH), 4.09-4.14 (m, 4H, 2×OCH$_2$), 4.53-4.56 (d, Rotamer); $^{13}$C NMR (CDCl$_3$) δ 14.49 (CH$_3$), 21.05 (CH$_2$), 28.40 (CH), 29.55 (CH$_2$), 30.14 (CH$_2$), 32.41 (CH$_2$), 32.99 (CH$_2$), 53.04 (CH$_2$), 54.90 (CH$_2$), 60.79 (CH), 63.11 (OCH$_2$), 156.22 (NCO$_2$); LCMS calcd for C$_{35}$H$_{68}$N$_4$O$_4$ [M+H]$^+$: m/z 608.5241. found m/z 610 [(M+H)$^+$, 100%].

Example 2.5

Synthesis of 1,6-Bis(Carbamic Acid 2-[Bis-(2-Hydroxyethyl)-Amino]-Ethyl Esteryl)Hexane (Formula F-2.5) and Characterisation IR (CDCl$_3$, KBr) $v_{max}$/cm$^{-1}$ 3353, 3014, 2938, 1699, 1539, 1256; $^1$H NMR (d$_6$-DMSO) δ 1.09-1.22 (m, 4H, 2×CH$_2$), 1.34-1.39 (m, 4H, 2×CH$_2$), 2.54-2.57 (m, 8H, 4×CH$_2$), 2.68-2.70 (m, 4H, 2×CH$_2$), 2.92-2.95 (m, 4H, 2×CH$_2$), 3.35-3.41 (m, 8H, 4×CH$_2$), 3.93-3.98 (t, 4H, 2×OCH$_2$, J=6.29), 4.30-4.34 (m, 4H, 4×OH), 7.03-7.08 (m, 2H, 2×NH); $^{13}$C NMR (d$_6$-DMSO) δ 26.30 (CH$_2$), 29.74 (CH$_2$), 40.48 (CH$_2$), 53.99 (CH$_2$), 57.49 (CH$_2$), 59.66 (CH$_2$), 62.24 (OCH$_2$), 156.59 (NCO$_2$); LCMS calcd for C$_{20}$H$_{42}$N$_4$O$_8$ [M+H]$^+$: m/z 466.3003. found m/z 467 [(M+H)$^+$, 80%].

Example 2.6

Synthesis of 1,6-Bis(Carbamic Acid 2-[Bis-Butyl-Amino]-Ethyl Esteryl)Hexane (Formula F-2.6) and Characterisation IR (CHCl$_3$, KBr) $v_{max}$/cm$^{-1}$ 2932, 1698, 1536, 1256; $^1$H NMR (d$_6$-DMSO) δ 0.83-0.89 (t, 12H, 4×CH$_3$, J=7.10), 1.11-1.36 (m, 24H, 12×CH$_2$), 2.35-2.41 (m, 8H, 4×CH$_2$), 2.51-2.57 (m, 4H, 2×CH$_2$), 2.89-2.97 (m, 4H, 2×CH$_2$), 3.91-3.96 (t, 4H, 2×OCH$_2$, J=6.3), 7.01-7.06 (t, 2H, 2×NH, J=5.6); $^{13}$C NMR (d$_6$-DMSO) δ 14.28 (CH$_3$), 20.31 (CH$_2$), 26.30 (CH$_2$), 29.40 (CH$_2$), 29.79 (CH$_2$), 40.86 (CH$_2$), 52.82 (CH$_2$), 54.01 (CH$_2$), 62.20 (OCH$_2$), 156.52 (NCO$_2$); LCMS calcd for C$_{28}$H$_{58}$N$_4$O$_4$ [M+H]$^+$: m/z 514.4458. found m/z 515 [(M+H)$^+$, 90%].

Example 2.7

Synthesis of 3-(Carbamic Acid 2-[Bis-(2-Hydroxyethyl)-Amino]-Ethyl Esteranato)Methyl-3,5,5-Trimethyl Cylcohexyl Carbamic Acid 2-[Bis-(2-Hydroxyethyl)-Amino]-Ethyl Ester) (Formula F-2.7) and Characterisation IR (CDCl$_3$, KBr) $v_{max}$/cm$^{-1}$ 3423, 3018, 2957, 1707, 1520, 1217; $^1$H NMR (d$_6$-DMSO) δ 0.79-0.98 (m, 15H, (3×CH$_2$)+(3×CH$_3$)), 1.35-1.44 (m, 3H, CH$_2$+CH), 2.54-2.59 (m, 8H, 4×CH$_2$), 2.69 (m, 4H, 2×CH$_2$), 3.37-3.41 (m, 8H, 4×CH$_2$), 3.96 (m, 4H, 2×OCH$_2$), 4.31-4.34 (m, 4H, 4×OH), 6.95-6.98 (d, 1H, NH, J=7.5), 7.08-7.13 (t, 1H, NH, J=6.4); $^{13}$C NMR (d$_6$-DMSO) δ 23.55 (CH3), 25.48 (CH$_2$), 27.85 (CH$_2$), 27.85 (CH$_2$), 35.35 (C), 36.68 (CH), 53.98 (CH$_2$), 57.52 (CH$_2$), 59.59 (CH$_2$), 67.37 (OCH$_2$), 157.27 (C=O); LCMS calcd for C$_{24}$H$_{48}$N$_4$O$_8$ [M+H]$^+$: m/z 520.3472. found m/z 521 [(M+H)$^+$, 50%].

Example 2.8

Synthesis of 3-(Carbamic Acid 2-[Bis-Butyl-Amino]-Ethyl Esteranato)Methyl-3,5,5-Trimethyl Cylcohexyl Carbamic Acid 2-[Bis-Butyl-Amino]-Ethyl Ester) (Formula F-2.8) and Characterisation IR (CHCl$_3$, KBr) $v_{max}$/cm$^{-1}$ 3017, 2958, 1708, 1519, 1217; $^1$H NMR (d$_6$-DMSO), δ 0.84-0.92 (m, 21H, 7×CH$_3$), 0.96-0.98 (m, 8H, 4×CH$_2$), 1.21-1.37 (m, 14H, 7×CH$_2$), 2.35-2.38 (m, 8H, 4×CH$_2$), 2.49-2.52 (m, 4H, 2×CH$_2$), 2.55-2.57 (m, 2H, 1×CH$_2$), 3.56-3.59 (m, 1H, 1×CH), 3.90-3.97 (m, 4H, 2×OCH$_2$), Rotamer NH; $^{13}$C NMR (d$_6$-DMSO) δ 14.30 (CH$_3$), 20.32 (CH$_2$), 23.46 (CH$_3$), 27.83 (CH$_3$), 29.40 (CH$_2$), 31.74 (C), 35.34 (CH$_3$), 36.68 (C), 52.84 (CH$_2$), 54.02 (CH$_2$), 62.11 (CH), 62.33 (CH$_2$), 157.18 (NCO$_2$); LCMS calcd for C$_{32}$H$_{64}$N$_4$O$_4$ [M+H]$^+$; m/z 568.4928. found m/z 569 [(M+H)$^+$, 80%].

Example 2.9

Synthesis of 3,3'-Methyoxy-4,4'-Biphenylene(Carbamic Acid 2-[Bis-(2-Hydroxyethyl)-Amino]-Ethyl Ester) (Formula F-2.9) and Characterisation $^1$H NMR (d$_6$-DMSO) δ 2.54-2.61 (m, 8H, 4×CH$_2$), 2.73-2.77 (m, 4H, 2×CH$_2$), 3.43-3.45 (m, 8H, 4×CH$_2$), 3.89-3.91 (s, 6H, 2×OCH$_3$), 4.12 (m, 4H, 2×OCH$_2$). 4.34-4.38 (s, 4H, 4×OH), 7.21.7.22 (m, 4H, 4×ArH), 7.41-7.42 (m, 2H, 2×ArH), 8.43 (s, 2H, 2×NH); $^{13}$C NMR (d$_6$-DMSO) δ 25.48 (CH$_2$), 53.76 (NCH$_2$), 56.21 (OCH$_3$), 59.76 (CH$_2$OH), 63.07 (OCH$_2$), 109.85 (ArC), 126.74 (ArC), 136.40 (ArC), 150.10 (ArC), 154.17 (C=O); LCMS calcd for C$_{28}$H$_{42}$N$_4$O$_{10}$ [M+H]$^+$: m/z 594.2901. found m/z 595 [(M+H)$^+$, 40%].

Example 2.10

Synthesis of 3,3'-Methyoxy-4,4'-Biphenylene(Carbamic Acid 2-[Bis-Butyl-Amino]-Ethyl Ester) (Formula F-2.10) and Characterisation IR (CDCl$_3$, KBr) $v_{max}$/cm$^{-1}$ 3019, 2960, 1728, 1520, 1215; $^1$H NMR (d$_6$-DMSO) δ 0.84-0.90 (m, 12H, 4×CH$_3$), 1.26-1.39 (m, 16H, 8×CH$_2$), 2.39-2.45 (m, 8H, 4×CH$_2$), 2.62-2.67 (t, 4H, 2×CH$_2$, J=6.20), 3.90-3.91 (m, 6H, 2×OCH$_3$), 4.07-4.12 (m, 4H, 2×OCH$_2$), 7.25-7.26 (m, 4H, 4×ArH), 7.69-7.73 (m, 2H, 2×ArH), 8.33 (s, 2H, 2×NH); $^{13}$C NMR (d$_6$-DMSO)

δ 14.30 (CH$_3$), 20.32 (CH$_2$), 25.48 (CH$_2$), 29.40 (CH$_2$), 54.05 (NCH$_2$), 56.20 (OCH$_3$), 63.07 (OCH$_2$), 109.81 (ArC), 118.83 (ArC), 126.73 (2×ArC), 136.50 (ArC), 150.05 (ArC), 154.08 (C=O); LCMS calcd for C$_{36}$H$_{58}$N$_4$O$_6$ [M+H]$^+$: m/z 642.4356. found m/z 643 [(M+H)$^+$, 40%].

Example 3

Urea Examples

General Experimental Procedure for the Synthesis of Hydroxyl Terminated Bis-Ureas.

To a solution of 2-aminoethyl-N,N-bis(2-hydroxyethyl) amine (1.99 g, 13.4 mmol) in dry CH$_2$Cl$_2$ (25 ml) under an argon atmosphere maintained under reflux was added in a dropwise fashion bis-isocyanate (6.7 mmol) in dry CH$_2$Cl$_2$ (75 ml) over a period of approximately 90 minutes. This mixture was then heated at reflux and stirred for 1 hour and then allowed to cool to room temperature. The reaction was then poured into n-pentane (350 ml) that was cooled down to −78° C. A white precipitate formed which was filtered off under vacuum. This material was reprecipitated from n-pentane a further two times and the residual solvent was removed under high vacuum to yield the desired product.

General Experimental Procedure for the Synthesis of Butyl Terminated Bis-Ureas.

To a solution of a bis-isocyanate (8.7 mmol) in dry THF (40 ml) under an argon atmosphere maintained under reflux was added a solution of 2-aminoethyl-N,N-bisbutyl amine (3 g, 17.4 mmol) in dry THF (10 ml). The reaction mixture was stirred and heated at reflux for a period of 12 hours and then allowed to cool to room temperature. The solution was concentrated in vacuo to yield the desired product with no further purification necessary.

TABLE 3

Type and amounts of amines and isocyanates for the different ureas (or Amino carbonyl amino) made.

| Ex. No. | Amine Type | Amount | Isocyanate Type | Amount | Obtained Product [g)] | Yield [%] |
|---|---|---|---|---|---|---|
| 3.1 | AEBHEA [a)] | 1.99 g | MDI [c)] | 1.68 g | F-3.1 | 47 |
| 3.2 | AEBBA [b)] | 3.00 g | MDI [c)] | 2.18 g | F-3.2 | 85 |
| 3.4 | AEBBA [b)] | 2.93 g | HMDI [d)] | 2.23 g | F-3.4 | 73 |
| 3.6 | AEBBA [b)] | 3.00 g | HDI [e)] | 1.46 g | F-3.6 | 17 |
| 3.7 | AEBHEA [a)] | 3.00 g | IPDI [f)] | 2.25 g | F-3.7 | 65 |
| 3.8 | AEBBA [b)] | 3.00 g | IPDI [f)] | 1.93 g | F-3.8 | 83 |

[a)] AEBHEA stands for 2-aminoethyl-N,N-bis(2-hydroxyethyl)amine
[b)] AEBBA stands for 2-aminoethyl-N,N-bisbutyl amine
[c)] MDI stands for 4,4'-methylenebis(phenylisocyanate)
[d)] HMDI stands for hydrogenated 4,4'-methylenebis(phenylisocyanate)
[e)] HDI stands for hexane diisocyanate
[f)] IPDI stands for isophorone diisocyanate
[g)] The formula are shown in the appendix

Example 3.1

Synthesis of 3-(2-[Bis-2-Hydroxyethyl)-Amino]-Ethyl Amino Carbonyl Amino Methyl-3,5,5-Trimethyl Cyclohexyl Aminocarbonyl(2-[Bis-2-Hydroxyethyl)-Amino]-Ethyl Amine) (Formula F-3.1) and Characterisation The obtained product was a white solid. IR (MeOH, KBr) ν$_{max}$/cm$^{-1}$ 3384, 2945, 2832, 2523, 2229, 2045, 1455; $^1$H NMR (CD$_3$OD) δ 0.88-1.68 (br m, 15H, (3×CH$_3$)+(3×CH$_2$)), 2.78-2.90 (br m, 12H, 6×CH$_2$N), 3.23-3.33 (br m, 7H, NHCH$_2$+(3×NHCH$_2$), 3.64-3.77 (br m, 8H, 4×CH$_2$OH).

Example 3.2

Synthesis of 4,4'-Methylenebis(Phenyl 2-[Bis-Butyl-Amino]-Ethyl Amino Carbonyl Amine) (Formula F-3.1) and Characterisation The obtained product was a yellow solid. IR (CDCl$_3$, KBr) ν$_{max}$/cm$^{-1}$ 3430, 3338, 2959, 2933, 2864, 2817, 1793, 1662, 1601, 1513, 1469, 1412; $^1$H NMR (d$_6$-DMSO) δ 0.83-0.89 (t, 12H, 4×CH$_3$, J=7.2), 1.17-1.43 (m 16H, 8×CH$_2$), 2.38-2.44 (m, 8H, 4×CH$_2$), 2.53-2.57 (t, 4H, 2×CH$_2$, J=5.4), 3.24-3.30 (m, 4H, 2×CH$_2$), 5.44 (br s, 2H, 2×NH), 6.98-7.09 (AA'XX' system, 4H, 4×ArCH), 7.17-7.21 (AA'XX' system, 4H, 4×Arch); $^{13}$C (CDCl$_3$) □ 14.461 (CH$_3$), 21.02 (CH$_2$), 29.24 (CH$_2$), 38.89 (CH$_2$NH), 41.00 (ArCH$_2$Ar), 54.37 (CH$_2$N+NCH$_2$), 120.96 (ArC), 129.69 (ArC), 136.18 (ArC), 137.74 (ArC), 157.63 (C=O).

Example 3.4

Synthesis of 4,4'-Methylenebis(Cyclohexyl 2-[Bis-Butyl-Amino]-Ethyl Amino Carbonyl Amine) (Formula F-3.1) and Characterisation IR (CDCl$_3$, KBr) ν$_{max}$/cm$^{-1}$ 3365, 3154, 2959, 2931, 2861, 1793, 1648, 1522, 1468, 1380; $^1$H NMR (d$_6$-DMSO) δ 0.84-0.88 (t, 12H, 4×CH$_3$, J=7.2), 1.00-1.78 (br m, 36H, (17×CH$_2$)+(2×CH)), 2.38 (br s, 8H, 4×NCH$_2$), 2.99-3.03 (m, 4H, 2×CH$_2$N), 3.21-3.45 (br m, 4H, 2×NHCH$_2$), 3.63 (br s, 2H, 2×CHNH), 5.57 (br s, 1H, NH), 5.69 (br s, 1H, NH), 5.89-5.91 (d, 1H, NH, J=7.8), 6.07-6.08 (d, 1H, NH, J=7.5).

Example 3.8

Synthesis of 3-(2-[Bis-Butyl-Amino]-Ethyl Amino Carbonyl Amino Methyl-3,5,5-Trimethyl Cylcohexyl Aminocarbonyl(2-[Bis-Butyl-Amino]-Ethyl Amine) (Formula F-3.1) and Characterisation IR (CDCl$_3$, KBr) ν$_{max}$/cm$^{-1}$ 3324, 3154, 2959, 2933, 2874, 1793, 1651, 1566, 1468, 1383; $^1$H NMR (d$_6$-DMSO) δ 0.76-1.4 (br m, 43H, (7×CH$_3$)+(11×CH$_2$)), 2.32-2.37 (m, 8H, 4×NCH$_2$), 2.73 (br s, 4H, CH$_2$N), 2.98-3.02 (m, 6H, 3×CH$_2$NH), 3.7 (br s, 1H, CHNH), 5.55-5.60 (m, 1H, NH), 5.65-5.69 (m, 1H, NH), 5.80-5.83 (m, 1H, NH), 6.05-6.15 (m, 1H, NH); $^{13}$C NMR (d$_6$-DMSO) δ 13.97 (CH$_3$), 20.04 (CH$_2$), 23.29 (CH$_3$), 27.59 (CH$_3$), 28.91 (CH$_2$), 37.63 (NHCH$_2$), 42.30 (CH$_2$+NHCH), 46.64 (CH$_2$), 47.00 (CH$_2$), 53.33 (CH$_2$NH), 53.46 (NCH$_2$), 53.86 (CH$_2$N).

Example 4

Polymer Examples

General Experimental Procedure for the Synthesis of Hydroxyl Terminated Modified Polymers.

To a solution of triethanolamine (5.00 g, 0.86 mmol) in dry THF (25 ml) under an argon atmosphere maintained at reflux, a solution of a 4,4'-methylenebis(phenylisocyanate) terminated polymer (1.73 mmol) in dry THF (75 ml) was added in a dropwise fashion over a period of approximately 90 minutes. This mixture was then heated and stirred for 1 hour and then allowed to cool to room temperature. The reaction was then poured into methanol (350 ml) that was cooled down to −78° C. A white precipitate formed which was filtered off under vacuum. This material was reprecipitated from methanol a further two times and the residual solvent was removed under high vacuum to yield the desired product.

General Experimental Procedure for the Synthesis of Butyl Terminated Modified Polymers.

To a stirred solution of a 4,4'-methylenebis(phenylisocyanate) terminated polymer (0.86 mmol) in THF (50 ml) maintained at reflux under an argon atmosphere was added 2-hydroxyethyl-N,N-bisbutylamine (0.3 g, 1.73 mmol). The mixture was stirred at reflux for approximately four hours and allowed to cool to room temperature. The mixture was then poured into methanol (350 ml) that was cooled down to −78° C. An off white precipitate formed which was filtered off under vacuum. This material was reprecipitated from methanol a further two times and the residual solvent was removed under high vacuum to yield the desired product.

TABLE 4

Type and amounts of amines and isocyanates for the different polymeric urethanes andureas (or Amino carbonyl amino) made.

| Ex. No. | Alcohol or Amine Type | Amount | Isocyanate Type | Amount | Obtained Product[f] | Yield [%] |
|---|---|---|---|---|---|---|
| 4.1 | triethanolamine | 0.60 g | MDI-PPG[c] | 5.00 g | F-4.1 | 24 |
| 4.2 | triethanolamine | 0.26 g | MDI-PIB[d] | 5.00 g | F-4.2 | 90 |
| 4.3 | triethanolamine | 0.38 g | MDI-PE-co-B[e] | 5.00 g | F-4.3 | n.m.[g] |
| 4.4 | HEBBA[a] | 0.30 g | MDI-PPG[c] | 5.00 g | F-4.4 | n.m.[g] |
| 4.5 | HEBBA[a] | 0.81 ml | MDI-PIB[d] | 5.00 g | F-4.5 | 80 |
| 4.10 | AEBBA[b] | 0.69 | MDI-PPG[c] | 5.00 g | F-4.10 | n.m.[g] |

[a] HEBBA stands for 2-hydroxyethyl-N,N-bisbutylamine
[b] AEBBA stands for 2-aminoethyl-N,N-bisbutyl amine
[c] MDI-PPG stands for MDI terminated Poly(propylene glycol) which was obtained by adding 320 g of Voranol P2000 poly(propylene glycol) with Mn = 2000 g/mole (from Dow Chemicals) to a round-bottomed flask and heated with stirring. Vacuum was applied for 1 hour at 110° C. After releasing the vacuum, 80 g of 4,4' MDI (from Bayer) was added (NCO/OH 2/1). After a few minutes to allow mixing, vacuum was reapplied and the reaction continued for 1 hour at 110° C., producing an isocyanate terminated poly(propylene glycol). The free MDI content was about 2%.
[d] MDI-PIB stands for MDI terminated Poly(isobutylene)diol which was obtained as MDI-PPG, except 400 g of KLP-L2203 poly(ethylene-co-butylene) with Mn = 3400 g/mole (from Kraton polymers) was used as diol and 58.8 g of MDI was used to produce an isocyanate terminated poly(ethylene-co-butylene). The free MDI content was about 2%.
[e] MDI-PE-co-B stands for MDI terminated Poly(ethylene-co-butylene)diol which was obtained as MDI-PPG, except 372.3 g of Oppanol DL poly(isobutylene) with Mn = 5300 g/mole (from BASF) was used as a diol and 27.7 g of MDI was used to produce an isocyanate terminated poly(isobutylene) The free MDI content was about 2%.
[f] The formula see text.
[g] n.m. stands for "not measured".

Example 4.1

Synthesis of 4-(((4'-Carbamic Acid 2-[Bis-(2-Hydroxyethyl)-Amino]-Ethyl Ester) Phenyl) Methylene)-Phenyl-Amino-Carbonyl Terminated Poly(Propylene)Glycol (Formula F-4.1) and Characterisation IR (Thin Film, KBr) $v_{max}/cm^{-1}$ 3302, 3122, 2875, 2019, 1905, 1733, 1603, 1538, 1455; $^1$H NMR (CD$_3$OD) δ 1.16-1.18 (br d, 3H$_n$, CH$_3$, J=5.3), 1.29-1.32 (d, 3H, CH$_3$, J=6.3), 2.75-2.80 (t, 8H, 4×NCH$_2$, J=5.8), 2.89-2.94 (t, 4H, 2×CH$_2$N, J=5.9), 3.50-3.66 (br m, 8H+3H$_n$, (4×CH$_2$OH)+(OCH+CH$_2$O)$_n$), 3.90 (s, 4H, 2×ArCH$_2$Ar), 4.23-4.2 (t, 4H, 2×OCH$_2$, J=5.9), 7.12-7.15 (AA'XX' system, 8H, 8×ArH), 7.36-7.40 (AA'XX' system, 8H, 8×ArH).

Example 4.2

Synthesis of 4-(((4'-Carbamic Acid 2-[Bis-(2-Hydroxyethyl)-Amino]-Ethyl Ester) Phenyl) Methylene)-Phenyl-Amino-Carbonyl Terminated Poly(Isobutylene) Diol (Formula F-4.2) and Characterisation The obtained product was a clear rubbery gel. IR (CDCl$_3$, KBr) $v_{max}/cm^{-1}$ 3689, 3436, 3155, 2955, 1793, 1713, 1600, 1522, 1472, 1413, 1389, 1366; $^1$H NMR (CDCl$_3$) δ 1.11 (s, 6H$_n$, 2×CH$_3$), 1.41 (s, 2H$_n$, CH$_2$), 2.72-2.76 (m, 8H, 4×NCH$_2$), 2.82-2.87 (m, 4H, 2×CH$_2$N), 3.60-3.64 (m, 8H, 4×CH$_2$OH), 3.88 (s, 4H, 2×ArCH$_2$Ar), 4.08-4.14 (m, 4H, 2×OCH$_2$), 4.24-4.28 (m, 2H, CH$_2$O), 7.08-7.11 (AA'XX' system, 8H, 8×ArH), 7.26-7.30 (AA'XX' system, 8H, 8×ArH).

Example 4.3

Synthesis of 4-(((4'-Carbamic Acid 2-[Bis-(2-Hydroxyethyl)-Amino]-Ethyl Ester) Phenyl) Methylene)-Phenyl-Amino-Carbonyl Terminated Poly(Ethylene-Co-Butylene) Diol (Formula F-4.3) and Characterisation IR (CDCl$_3$, KBr) $v_{max}/cm^{-1}$ 3436, 3154, 2961, 2926, 2854, 1793, 1729, 1595, 1522, 1463, 1413, 1380; $^1$H NMR (CDCl$_3$) δ 0.80-0.85 (m, 3H$_n$, CH$_3$), 1.07-1.26 (br m, 7H$_n$, (OCH$_2$+(3×CH$_2$)+OCH)$_n$), 2.71-2.75 (t, 8H, 4×NCH$_2$, J=5.1), 2.81-2.85 (t, 4H, 2×CH$_2$N, J=5.3), 3.60-3.63 (t, 8H, 4×CH$_2$OH, J=5.1), 3.88 (s, 4H, 2×ArCH$_2$Ar), 4.14-4.25 (m, 7H, (3×OCH$_2$)+CHO), 7.04-7.08 (AA'XX' system, 8H, 8×ArH), 7.26-7.30 (AA'XX' system, 8H, 8×ArH).

Example 4.4

Synthesis of 4-(((4'-Carbamic Acid 2-[Bisbutyl-Amino]-Ethyl Ester) Phenyl) Methylene)-Phenyl-Amino-Carbonyl Terminated Poly(Propylene)Glycol (Formula F-4.4) and Characterisation IR (CDCl$_3$, KBr) $v_{max}/cm^{-1}$; $^1$H NMR (CDCl$_3$) δ 0.88-0.93 (t, 12H, 4×CH$_3$, J=7.2), 1.13-1.15 (br d, 3H$_n$, CH$_3$, J=4.3), 1.25-1.46 (m, 16H, 8×CH$_2$), 2.45-2.50 (m, 8H, 4×NCH$_2$), 2.69-2.74 (m, 4H, 2×CH$_2$N), 3.37-3.60 (br m, 3H$_n$, OCH+CH$_2$O), 3.88 (s, 4H, 2×ArCH$_2$Ar), 4.18-4.23 (m, 4H, 2×OCH$_2$), 4.95-5.05 (m, 3H, OCH+CH$_2$O), 7.07-7.11 (AA'XX' system, 8H, 8×ArH), 7.26-7.29 (AA'XX' system, 8H, 8×ArH).

Example 4.5

Synthesis of 4-(((4'-Carbamic Acid 2-[Bisbutyl-Amino]-Ethyl Ester) Phenyl) Methylene)-Phenyl-Amino-Carbonyl Terminated Poly(Isobutylene) Diol (Formula F-4.5) and Characterisation The obtained product was a yellow oil. IR (CDCl$_3$, KBr) $v_{max}/cm^{-1}$; $^1$H NMR (CDCl$_3$) δ 0.90-1.41 (br m, 8H$_n$+28H, ((CH$_2$+(2×CH$_3$))$_n$+((8×CH2)+(4×CH$_3$))), 2.45-2.51 (m, 8H, 4×NCH$_2$), 2.72-2.75 (m, 4H, 2×CH$_2$N), 3.88 (s, 4H, 2×ArCH$_2$Ar), 4.09-4.11 (m, 4H, 2×O CH$_2$), 4.18-4.23 (m, 2H, CH$_2$O), 7.08-7.11 (AA'XX' system, 8H, 8×ArH), 7.26-7.29 (AA'XX' system, 8H, 8×ArH).

Example 5

Characterisation of Supramolecutar Behaviour

The synthesised inventive materials do all show the very typical behaviour of materials forming supramolecular structures below its transition temperature. Hence, below this temperature, it behaves like a solid and does not flow at all. Above its temperature, it behaves like a liquid, while the comparison material remains crystalline up to the melting point, which is significantly higher than the transition temperature.

Some of the materials were characterised in more detail and support the supramolecular structure behaviour at low temperatures. Typical methods include Rheology measurements and Differential Scanning Chromatography (DSC). The TGA data show the general high heat resistance of the material, which typically decompose only at around 200° C. or higher. The obtained data are summarised in Table 5.

ca. +10° C. as a result of hydrogen bonding interactions. FIG. 3 is in analogy to FIG. 2 and exhibits a multiphase behaviour as a result of the polymeric nature of the measured compound.

The comparative experiments 1.1 to 1.8 however, do all show just a clear melting point as indicated in Table 1 and no signs of any supramolecular behaviour. Rheological measurements could not being made due to their solid, crystalline state. The very significant differences between the inventive materials and the comparative ones support strongly that the inventive products exhibit the behaviour of supramolecular materials, which is in contrast to the comparative materials.

Furthermore, the supramolecular interactions have also been studied via a range of spectroscopic techniques including $^1$H and $^{13}$C NMR, IR and UV/Vis spectroscopy. The same observations were found to support the supramolecular structures as quoted in literature, as for examples in a) E. Marand, Q. Huand H. W. Gibson, *Macromolecules,* 1996, 29, 2555, b) K. Yamauchi, J. R. Lizotte and T. E. Long, Macromolecules, 2002, 35, 8745, c) Beijer, F. H.; Sijbesma, R. P.; Kooijman, H.; Spek, A. L.; Meijer, E. W.; J. Am. Chem. Soc. 1998, 120,

TABLE 5

Rheological, DSC and TGA Data of selected inventive materials.

| | RHEOLOGY | | | | | DSC DATA | | |
|---|---|---|---|---|---|---|---|---|
| | G' | | | | | | | |
| Comp. | G' (max) | (min) | Temperature of [° C.] | | | $T_{TR}1$ [d)] | $T_{TR}2$ [d)] | TGA |
| No. | [Pa] | [Pa] | G' (max) [a)] | G'(min) [b)] | Range [c)] | [° C.] | [° C.] | [° C.] [e)] |
| F-2.1 | 1.35E+07 | <5 | −12 | 40 | 52 | −19 | 11 | 193 |
| F-2.2 | 1.10E+07 | <5 | −13 | 20 | 33 | −24 | 12 | 200 |
| F-2.7 | ~1.2E+08 | <5 | −28 | 26 | 54 | −27 | 12 | 226 |
| F-2.3 | ~1.4E+08 | <5 | −20 | 38 | 58 | −25 | 10 | 211 |
| F-2.8 | ~1.1E+07 | <5 | −30 | 3 | 33 | −35 | 10 | 155 |
| F-2.4 | ~1E+07 | <5 | −32 | 2 | 34 | −30 | 10 | 197 |
| F-2.6 | | | | | | | 10 | 252 |

[a)] The temperature of G'(max) stands for temperature, where the storage modulus G' reaches it's maximum value.
[b)] The temperature of G'(min) stands for temperature, where the storage modulus G' reaches it's minimum value.
[c)] The range is the difference of the two temperatures described under [a)] and [b)].
[d)] $T_{TR}$ stands for the transition temperature measured.
[e)] The TGA data refer to the decomposition temperature of the materials Rheological plots are shown of the products obtained in examples 2.1 (Formula F-2.1) and 2.2 (Formula F-2.2), which are typical for all others. FIG. 1 shows the storage modulus G' (in Pa) against the temperature. It clearly can be seen that the storage modulus, which is related to viscosity, is well below the transition temperature at a constant very high level. However, over a temperature range of about 30 to 50° C. it decreases constantly to a very low level. The large oscillations in the value at high temperature are caused by errors in measuring storage modulus as a result of the extremely non-viscous nature of the material at this temperature.

Representative plots from Differential Scanning Chromatography (DSC) are shown in FIG. 2, showing the DSC plot of compound of Formula F-2.1, and in FIG. 3, showing the DSC plot of polymeric compound of Formula F-4.2. The left axis indicates the heat flow (from −0.25 to −0.05 W/g), the inner right axis the derivation of the complex Cp (from −0.04 to 0.10 J/g/° C./min) and the outer right axis, indicated by double arrows, the complex Cp (from 0.5 to 2.5 J/g/° C.). The x-axis computes the temperature from −100° C. to +150° C. It shows the temperature at which transitions between two phases take place, which are a molecular reordering e.g. in FIG. 2 at low temperature (ca. −13° C.) and another at 6761, d) G. C. Pimentel, A. L. McClellan, 'The Hydrogen Bond', W. H. Freeman and Company, 1960, e) C.-C. Peng and V. Abetz, Macromolecules, 2005, 38, 5575.

The invention claimed is:

1. A hot melt adhesive comprising a material, forming supramolecular structures below its transition temperature, characterised in that the material contains at least one C=O and/or C=S group and at least one N—H, O—H and/or S—H group and wherein the material has the structure

A(-X—B)$_n$ (1)

wherein A is a polymeric segment with at least 3 monomeric repeating units of cyclic, aromatic and/or aliphatic group but A does not include polyether or polyurethane, n being a number of 1 to 4, —X—B is, if n is 2, the same or different, and if n is 3 or 4, the same, partly the same or different and has one of the structures (2) to (4)

—NH—C(Y)—Y—B (2)

—NH—C(Y)—NR—B (3)

—Y—C(Y)—NR—B (4)

with Y being an Oxygen and/or Sulfur atom, B being an organic group with at least one Nitrogen atom which is bound to at least two carbon atoms when B is linear, and where the Nitrogen atom is bound to at least one carbon atom when B is branched, and R being a Hydrogen atom, and/or aliphatic group or another B group which is the same or different;

wherein the material can be repeatedly heated above its transition temperature to a fluid form and cooled below its transition temperature to a solid form.

2. The material according to claim 1, characterised in that the supramolecular structure has a transition temperature between about −50° C. and +200° C.

3. The material according to claim 1, characterised in that the supramolecular structure has 40° C. above the transition temperature a low storage modulus and 40° C. below the transition temperature a high storage modulus and whereas the difference of the two storage modulus at these temperatures is at least about 1000 Pa.

4. The material according to claim 3, characterised in that the storage modulus at the higher temperature is about 100,000 Pa or lower and that the storage modulus at the lower temperature is about 1,000,000 Pa or higher.

5. The material according to claim 1, characterised in that A has a number average molecular weight Mn of less than about 100,000.

6. The material according to claim 1, characterised in that B has a number average molecular weight Mn of less than about 5000.

7. The material according to claim 1, characterised in that the B further comprises Oxygen and/or Sulfur atom.

8. The material according to claim 1, characterised in that the B contains at least one tertiary amine group.

9. The material according to claim 1, characterised in that X is a urea, urethane, thiourea and/or a thiourethane group.

10. The material according to claim 1, characterised in that the material contains at least one reactive group, stable at elevated temperature, but capable of reacting upon non-thermal activation.

11. The material according to claim 10, characterised in that the reactive group is an unsaturated C—C bond, a hydroxyl, primary amine, secondary amine, acid, amide, isocyanate, epoxy, anhydride, imide, carbodiimide, organosilane, alkyl halide, acid halide, lactone, lactam, azlactone, oxazoline, aziridine, imine, oxazolidine, and/or cyclic carbonate group.

12. The material according to claim 10, characterised in that the non-thermal activation of the reactive group occurs upon contact with radicals, oxygen, acid, base, water and/or radiation.

13. The material according to claim 1, characterised in that the monomeric repeating units of A is selected from the group consisting of poly(isobutylene), poly(ethylene-co-butylene), polybutadiene and mixtures thereof.

14. A hot melt adhesive, comprising:

a material, forming supramolecular structures below its transition temperature, characterised in that the material contains at least one C═O and/or C═S group and at least one N—H, O—H and/or S—H group and wherein the material has the structure $$A(\text{-}X\text{---}B)_n \qquad (1)$$

wherein A is a cyclic, aromatic and/or aliphatic group but A is not polyurethane, n being a number of 1 to 4, —X—B is, if n is 2, the same or different, and if n is 3 or 4, the same, partly the same or different and has one of the structures (2) to (4)

$$\text{---NH---C(Y)---Y---B} \qquad (2)$$

$$\text{---NH---C(Y)---NR---B} \qquad (3)$$

$$\text{---Y---C(Y)---NR---B} \qquad (4)$$

with Y being an Oxygen and/or Sulfur atom, B being an organic group with at least one Nitrogen atom which is bound to at least two carbon atoms when B is linear, and where the Nitrogen atom is bound to at least one carbon atom when B is branched, and R being a Hydrogen atom, and/or aliphatic group or another B group which is the same or different;

wherein the adhesive is solid at room temperature but, upon heating, changes to a fluid state and on cooling the adhesive regains its solid form.

15. The hot melt adhesive of claim 14 wherein A is a polymeric segment with at least 3 monomeric repeating units that does not include polyether.

16. A material, forming supramolecular structures below its transition temperature selected from:

-continued
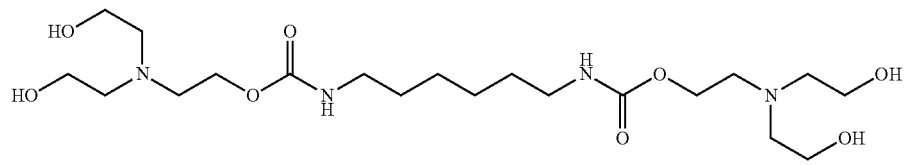
F-2.5
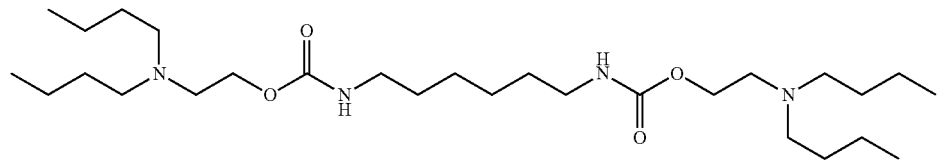
F-2.6
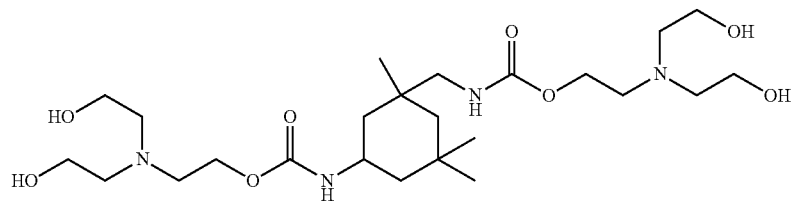
F-2.7
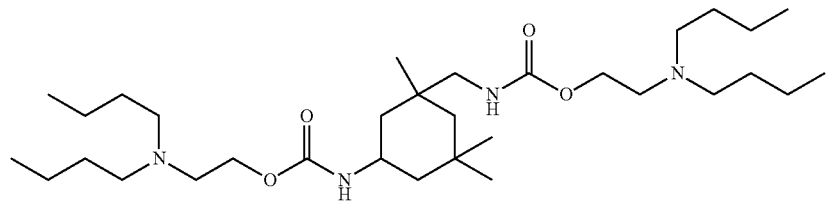
F-2.8
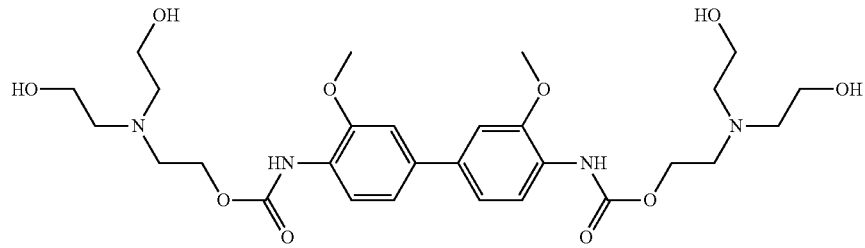
F-2.9
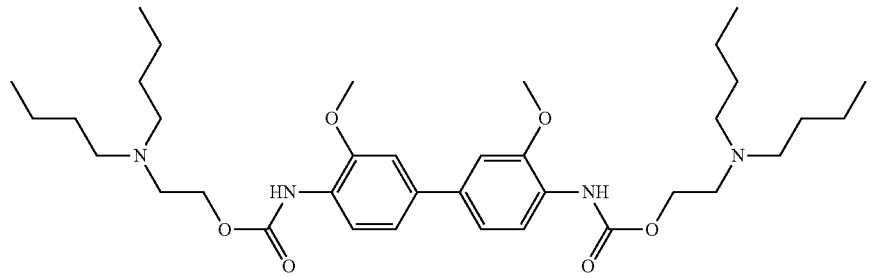
F-2.10
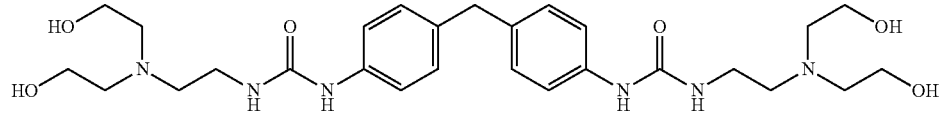
F-3.1
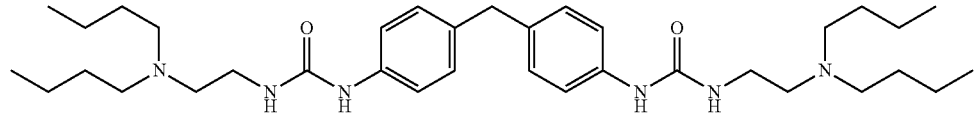
F-3.2

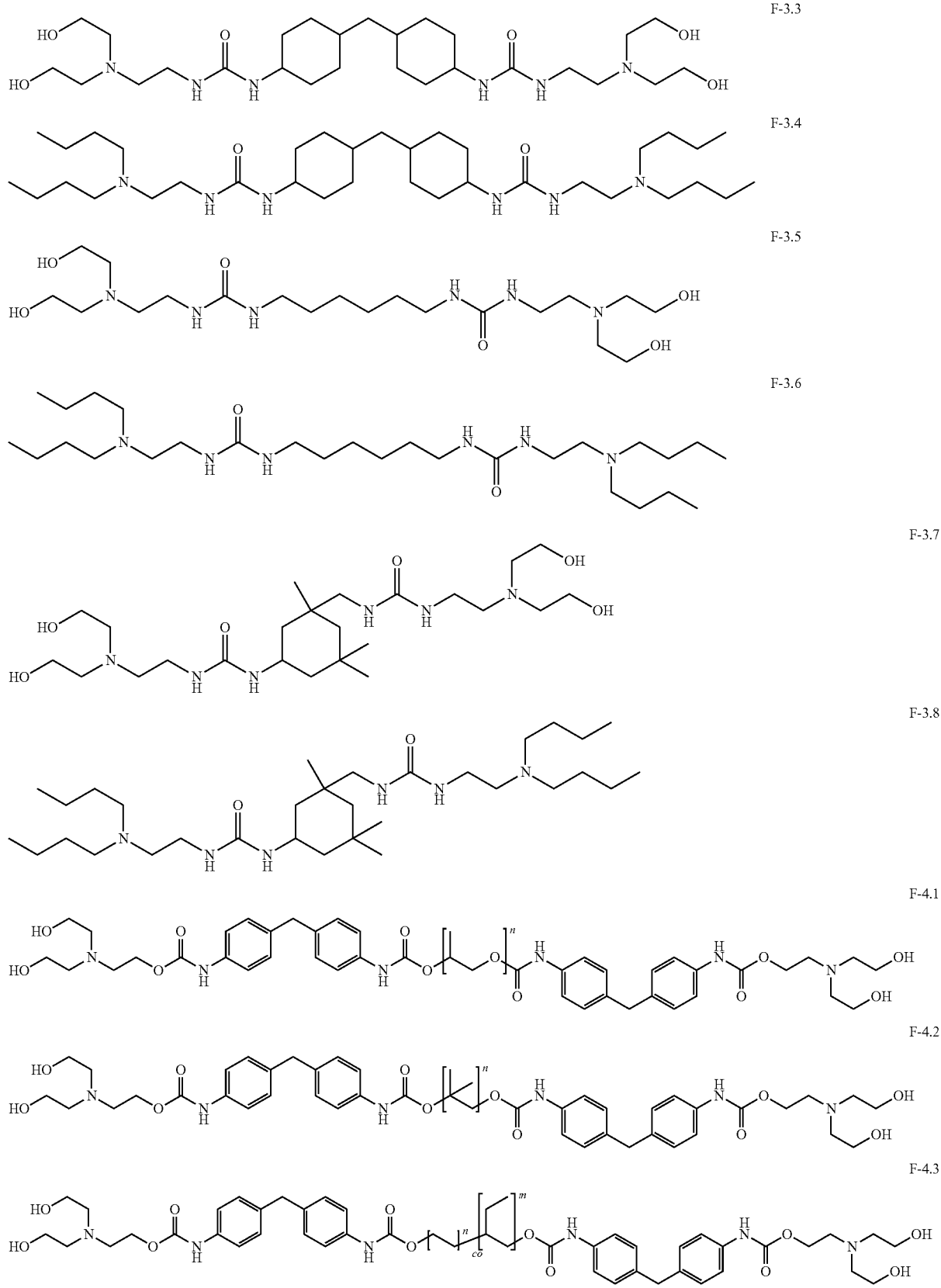

-continued
F-4.4
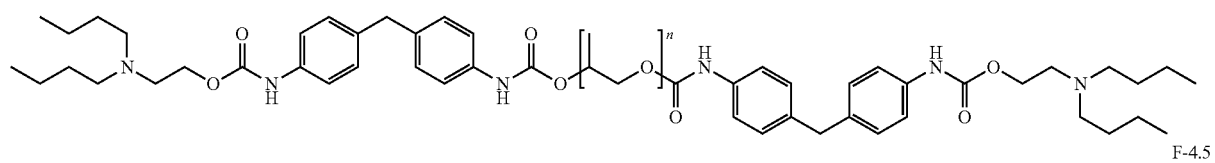
F-4.5
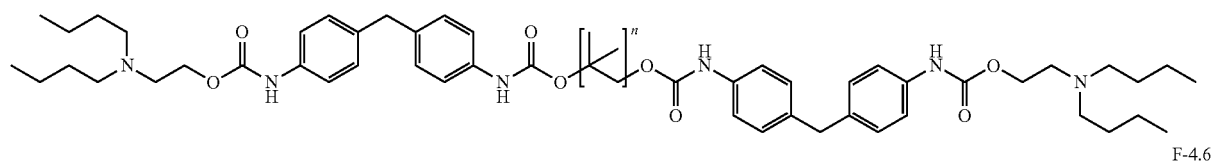
F-4.6
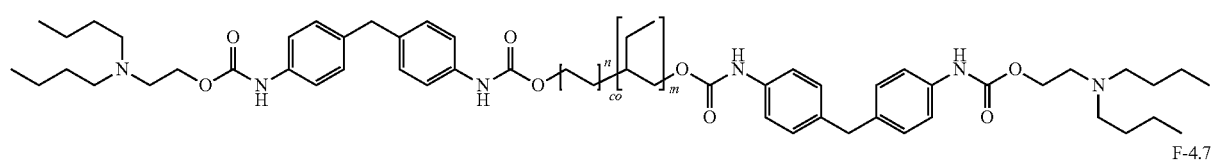
F-4.7
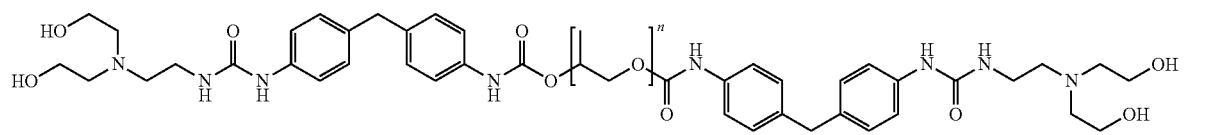
F-4.8
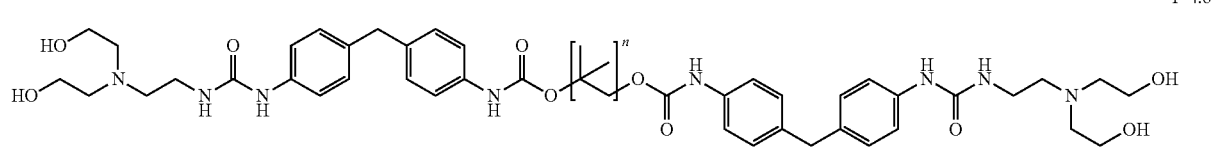
F-4.9
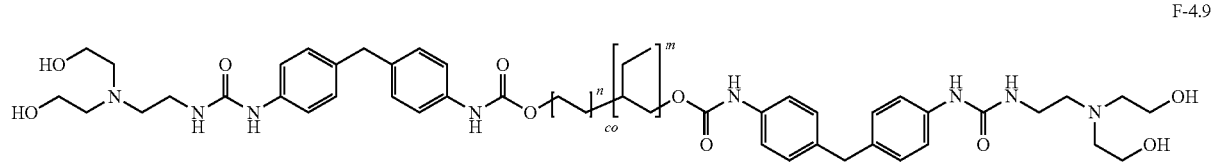
F-4.10
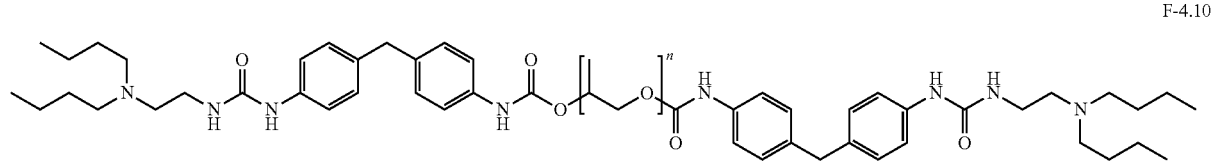
F-4.11
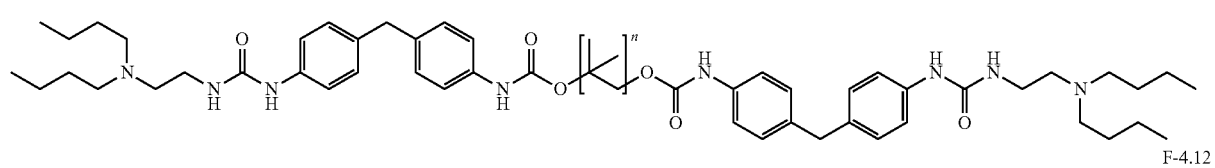
F-4.12
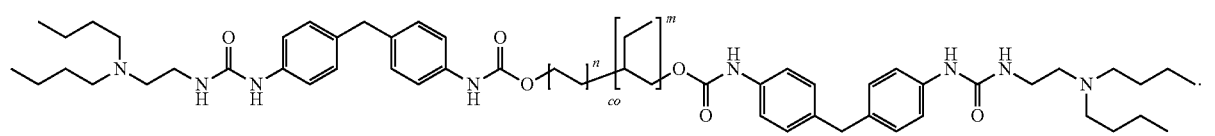
* * * * *